(12) United States Patent
Rappaport et al.

(10) Patent No.: US 12,320,910 B2
(45) Date of Patent: *Jun. 3, 2025

(54) SYSTEM, METHOD AND COMPUTER-ACCESSIBLE MEDIUM FOR REAL TIME IMAGING USING A PORTABLE DEVICE

(71) Applicant: NEW YORK UNIVERSITY, New York, NY (US)

(72) Inventors: Theodore S. Rappaport, Raleigh, NC (US); Ojas Kanhere, Brooklyn, NY (US)

(73) Assignee: New York University, New York, NY (US)

(*) Notice: Subject to any disclaimer, the term of this patent is extended or adjusted under 35 U.S.C. 154(b) by 643 days.

This patent is subject to a terminal disclaimer.

(21) Appl. No.: 17/552,200

(22) Filed: Dec. 15, 2021

(65) Prior Publication Data

US 2022/0107383 A1 Apr. 7, 2022

Related U.S. Application Data

(63) Continuation-in-part of application No. 16/422,517, filed on May 24, 2019, now Pat. No. 11,624,821.
(Continued)

(51) Int. Cl.
*G01C 19/00* (2013.01)
*G01P 15/00* (2006.01)
*G01S 5/02* (2010.01)

(52) U.S. Cl.
CPC ............ *G01S 5/0268* (2013.01); *G01C 19/00* (2013.01); *G01P 15/00* (2013.01); *G01S 5/0221* (2013.01); *G01S 5/0294* (2013.01)

(58) Field of Classification Search
CPC .... G01C 19/00; G01C 21/206; G01C 21/383; G01P 15/00; G01S 2013/464;
(Continued)

(56) References Cited

U.S. PATENT DOCUMENTS

| 5,446,461 A | 8/1995 | Frazier |
| 5,646,857 A * | 7/1997 | McBurney ............... G01C 5/00 701/489 |

(Continued)

OTHER PUBLICATIONS

Rappaport, T.S. "Wireless Communications, Principles and Practice" c. 2nd Edition, pp. 1-371, Pearson/Prentice Hall, 2002.
(Continued)

*Primary Examiner* — Timothy A Brainard
(74) *Attorney, Agent, or Firm* — WCF IP

(57) ABSTRACT

Exemplary system, method and computer-accessible medium for selecting at least one location of (i) at least one receiver or transceiver or (ii) at least one transmitter or transceiver can be provided. For example, it is possible to facilitate a receipt, from the at least one transmitter or transceiver, of a plurality of signals by the receiver(s) or transceiver(s). Each of the signals has a multipath component. Then, it is possible to determine time of flight (ToF) information and angle of arrival (AoA) information of the multipath components present in the signals. Further, it is possible to determine one or more possible locations of (i) the receiver(s) or transceiver(s) or (ii) the transmitter(s) or transceiver(s) based on the ToF information, the AoA information, and a model of physical surroundings. The location(s) of (i) the receiver(s) or transceiver(s), or (ii) the transmitter(s) or transceiver(s) can be selected based on the one or more possible locations.

17 Claims, 18 Drawing Sheets

Related U.S. Application Data

(60) Provisional application No. 62/852,053, filed on May 23, 2019, provisional application No. 62/675,869, filed on May 24, 2018.

(58) Field of Classification Search
CPC .... G01S 5/0205; G01S 5/0221; G01S 5/0268; G01S 5/0273; G01S 5/0294; G01S 5/16; G01S 5/18
See application file for complete search history.

(56) References Cited

U.S. PATENT DOCUMENTS

| | | | |
|---|---|---|---|
| 9,478,858 | B1 | 10/2016 | West et al. |
| 2010/0157736 | A1* | 6/2010 | Riordan ............. G01S 15/8902 367/88 |
| 2010/0295718 | A1 | 11/2010 | Mohamadi et al. |
| 2012/0062411 | A1 | 3/2012 | Shylo et al. |
| 2012/0214509 | A1* | 8/2012 | Levin .................... H04W 64/00 455/456.1 |
| 2014/0266345 | A1 | 9/2014 | Matsumura |
| 2015/0086084 | A1 | 3/2015 | Falconer et al. |
| 2015/0161818 | A1* | 6/2015 | Komenczi ............. G06T 19/006 348/43 |
| 2015/0212205 | A1* | 7/2015 | Shpater ................... G01S 13/56 342/28 |
| 2015/0268339 | A1* | 9/2015 | Dayi ....................... G01S 13/86 342/179 |
| 2015/0379356 | A1 | 12/2015 | Nikolova et al. |
| 2016/0291120 | A1* | 10/2016 | Rastegar ................ G01S 13/88 |
| 2016/0314613 | A1* | 10/2016 | Nowozin ................ G01S 7/497 |
| 2016/0330643 | A1* | 11/2016 | Sahin ..................... H04W 24/10 |
| 2018/0139623 | A1* | 5/2018 | Park ...................... G06V 20/188 |
| 2018/0249189 | A1* | 8/2018 | Cole ....................... G06T 15/06 |

OTHER PUBLICATIONS

Bowditch, J.I. "American practical navigator." Washington, D.C.: US Government Printing Office, pp. 1-714, 1938.
Sun, S. et al., "Hybrid beamforming for 5g millimeter-wave multicell networks," IEEE Conference on Computer Communications Workshops (INFOCOM WKSHPS), pp. 1-8, Apr. 2018.
Sume, A. et al., "Radar detection of moving targets behind corners," IEEE Transactions on Geoscience and Remote Sensing, vol. 49, No. 6, pp. 2259-2267, Jun. 2011.
Setlur, P. et al., "Multipath exploitation in non-los urban synthetic aperture radar," IEEE Journal of Selected Topics in Signal Processing, vol. 8, No. 1, pp. 137-152, Feb. 2014.
Sengupta, K. et al., "Terahertz integrated electronic and hybrid electronic-photonic systems," Nature Electronics, vol. 1, No. 12, p. 622, 2018.
Schaubach, K.R. et al., "A ray tracing method for predicting path loss and delay spread in microcellular environments," in Vehicular Technology Society 42nd VTS Conference—Frontiers of Technology, vol. 2, May 1992, pp. 932-935.
Ryan, J. et al., "Indoor Office Wideband Penetration Loss Measurements at 73 GHZ," in IEEE International Conference on Communications Workshop, May 2017, pp. 1-6.
Rodwell, M.J.W. "Sub-mm-wave technologies: Systems, ICs, THz transistors," in 2013 Asia-Pacific Microwave Conference Proceedings (APMC), Nov. 2013, pp. 509-511.
Rappaport T.S. et al., "Small-scale, local area, and transitional millimeter wave propagation for 5G communications," IEEE Transactions on Antennas and Propagation, vol. 65, No. 12, pp. 6474-6490, Dec. 2017.
Rappaport et al., "Millimeter Wave Mobile Communications for 5G Cellular: It will work!" pp. 1-15, 2013.
Rappaport, T.S. et al., "State of the art in 60-GHz integrated circuits and systems for wireless communications," Proceedings of the IEEE, vol. 99, No. 8, pp. 1390-1436, Aug. 2011.
Rappaport T. S. et al., Wide-band microwave propagation parameters using circular and linear polarized antennas for indoor wireless channels, IEEE Transactions on Communications, vol. 40, No. 2, pp. 240-245, Feb. 1992.
Priebe, S. et al., "Channel and Propagation Measurements at 300 GHz," IEEE Transactions on Antennas and Propagation, vol. 59, No. 5, pp. 1688-1698, May 2011.
Petrov, V. et al., "Terahertz band communications: Applications, research challenges, and standardization activities," in 2016 8th International Congress on Ultra Modern Telecommunications and Control Systems and Workshops (ICUMT), Oct. 2016, pp. 183-190.
Petrov, V. et al., "Applicability assessment of terahertz information showers for next-generation wireless networks," in 2016 IEEE International Conference on Communications (ICC), May 2016, pp. 1-7.
Parker, J.S. et al., "Exploiting the Terahertz Band for Radionavigation," Journal of Infrared, Millimeter, and Terahertz Waves, vol. 37, No. 10, pp. 1021-1042, Oct. 2016.
O'Toole, M. et al., "Confocal non-line-of-sight imaging based on the light-cone transform," Nature, vol. 555, No. 7696, p. 338, Mar. 2018.
Nagatsuma, T. "Breakthroughs in photonics 2013: Thz communications based on photonics," IEEE Photonics Journal, vol. 6, No. 2, pp. 1-5, Apr. 2014.
MmWave Coalition, "mmWave Coalition's NTIA comments," [From the Internet]. Available: http://mmwavecoalition.org/mmwave-coalition-millimeter-waves/mmwave coalitions-ntia-comments/, pp. 1-21, Jan. 2019.
Mittleman, D.M. "Twenty years of terahertz imaging," Opt. Express, vol. 26, No. 8, pp. 9417-9431, Apr. 2018.
Meissner, P. et al., "Accurate and Robust Indoor Localization Systems Using Ultra-wideband Signals," in European Navigation Conference (ENC), Apr. 2013, pp. 1-9.
McGillem, C. D. et al., "A beacon navigation method for autonomous vehicles," IEEE Transactions on Vehicular Technology, vol. 38, No. 3, pp. 132-139, Aug. 1989.
Mittleman, Daniel M. et al., "Twenty years of Terahertz Imaging [Invited]" Optics Express 9417, vol. 26, No. 8, Apr. 2018.
"Comments of the mmWave Coalition," 1-21, National Telecommunications and Information Administration U.S. Department of Commerce, 2019.
Zhang, Y.P. "Measurements of the characteristics of indoor penetration loss," in 1994 IEEE 44th Vehicular Technology Conference (VTC), vol. 3, Jun. 1994, pp. 1741-1744.
Zetik, R. et al., "Looking behind a corner using multipath-exploiting uwb radar," IEEE Transactions on Aerospace and Electronic Systems, vol. 51, No. 3, pp. 1916-1926, Jul. 2015.
Xu, F. et al., "Revealing hidden scenes by photon-efficient occlusion-based opportunistic active imaging," Optics express, vol. 26, No. 8, pp. 9945-9962, Apr. 2018.
Xing, Y. et al., "Verification and calibration of antenna cross-polarization discrimination and penetration loss for millimeter wave communications," in 2018 IEEE 88th Vehicular Technology Conference, Aug. 2018, pp. 1-6.
Xing, Y. et al., "Propagation Measurement System and Approach at 140 GHzMoving to 6G and Above 100 GHz," in IEEE 2018 Global Communications Conference, Dec. 2018, pp. 1-6.
Wang, H. et al., "A parametric formulation of the UTD diffraction coefficient for real-time propagation prediction modeling," IEEE Antennas and Wireless Propagation Letters, vol. 4, pp. 253-257, Aug. 2005.
McKown, J. W. et al., "Ray tracing as a design tool for radio networks," IEEE Network, vol. 5, No. 6, pp. 27-30, Nov. 1991.
Velten, A. et al., "Recovering three-dimensional shape around a corner using ultrafast time-of-flight imaging," Nature communications, vol. 3, p. 745, Mar. 2012.
Trichopoulos, G. C. et al., "A Broadband Focal Plane Array Camera for Real-time THz Imaging Applications," IEEE Transactions on Antennas and Propagation, vol. 61, No. 4, pp. 1733-1740, Apr. 2013.

(56) References Cited

OTHER PUBLICATIONS

Thajudeen, C. et al., "Measured complex permittivity of walls with different hydration levels and the effect on power estimation of twri target returns," Progress in Electromagnetics Research, vol. 30, pp. 177-199, 2011.

Thai, K. et al., "Around-the-corner radar: Detection and localization of a target in non-line of sight," in 2017 IEEE Radar Conference (RadarConf), May 2017, pp. 0842-0847.

Sun, S. et al., "Synthesizing omnidirectional antenna patterns, received power and path loss from directional antennas for 5G millimeter-wave communications," in 2015 IEEE Global Communications Conference (GLOBECOM), Dec. 2015, pp. 3948-3953.

Sun, S.et. al., "MIMO for millimeter-wave wireless communications: Beamforming, spatial multiplexing, or both?," IEEE Com. Mag., 2014.

Sun, S. et al., "Millimeter-wave distance-dependent large-scale propagation measurements and path loss models for outdoor and indoor 5G systems," in Proc. 10th EuCap, Davos, Switzerland, Apr. 2016, pp. 1-5.

Sun, S. et al., "Hybrid Beamforming for 5G Millimeter-Wave Multi-Cell Networks," IEEE InfoCom Honolulu, Apr. 1-8, 2018.

O'Toole, M. "Confocal non-line-of-sight imaging based on the light-cone transform," Nature, vol. 555, No. 7696, p. 338, Mar. 2018.

Aladsani, M. et al., "Leveraging mmWave Imaging and Communications for Simultaneous Localization and Mapping," in International Conference on Acoustics, Speech, and Signal Processing (ICASSP), May 2019, pp. 1-4.

Anderson, C. R. et al., "In-building wideband partition loss measurements at 2.5 and 60 GHz," IEEE Transactions on Wireless Communications, vol. 3, No. 3, pp. 922-928, May 2004.

Kapilevich B. et al., "Millimeter waves sensing behind walls-feseability study with fel radiation," 1-4, 2007.

Bowditch, J. I. American practical navigator. Washington, D.C.: US Government Printing Office, 1-714, 1938.

B5GS19, "The Brooklyn 5G Summit," Apr. 2019. [From the Internet]. https://brooklyn5gsummit.com/.

Chi, T. et al., "A packaged 90-to-300 GHz transmitter and 115 to-325GHz coherent receiver in CMOS for full-band continuous-wave mm-wave hyperspectral imaging," in 2017 IEEE International Solid-State Circuits Conference (ISSCC), Feb. 2017, pp. 304-305.

Ho, C.M.P. et al, "Antenna effects on indoor obstructed wireless channels and a deterministic image-based wide-band propagation model for in-building personal communication systems," Intl. Journal of Wireless Information Networks, Jan. 1994, pp. 61-76, 1994.

Davies, R. et al., "Wireless propagation measurements in indoor multipath environments at 1.7 GHZ and 60 GHz for small cell systems," in [1991 Proceedings] 41st IEEE Vehicular Technology Conference, May 1991, pp. 589-593.

Degli-Esposti, V. et al., "Measurement and modelling of scattering from buildings," IEEE Trans. on Ant. and Prop., vol. 55, No. 1, pp. 143-153, Jan. 2007.

Deng, S. et al., "28 GHz and 73 GHz millimeter-wave indoor propagation measurements and path loss models," in IEEE International Conference on Communications Workshops (ICCW), Jun. 2015, pp. 1244-1250.

Kiran Doddalla, S. et al., "Non-Line of Sight Terahertz imaging from a Single Viewpoint," in 2018 IEEE/MTT-S International Microwave Symposium-IMS, Jun. 2018, pp. 1527-1529.

Ministry of Internal Affairs and Communications, "Frequency Assignment Plan (as of Mar. 2019)," Mar. 2019. [From the Internet]. https://www.tele.soumu.go.jp/e/adm/freq/search/share/plan.htm.

Durgin, G.D. et al., "Measurements and models for radio path loss and penetration loss in and around homes and trees at 5.85 GHz," IEEE Transactions on Communications, vol. 46, No. 11, pp. 1484-1496, Nov. 1998.

Durgin, G. "An advanced 3D ray launching method for wireless propagation prediction," in 1997 IEEE 47th Vehicular Technology Conference. Technology in Motion, vol. 2, May 1997, pp. 785-789.

Durgin, G.D. et al., "Partition-based path loss analysis for in-home and residential areas at 5.85 GHz," in 1998 IEEE Global Communications Conference (GLOBECOM), vol. 2, Nov. 1998, pp. 904-909.

Statement of Commissioner Jessica Rosenworcel, [From the Internet] https://ecfsapi.fcc.gov/file/0228024926034/FCC-18-17A6.pdf.

FCC, "Spectrum horizons," First Report and Order ET Docket 18-21, Washington D. C., Mar. 21, 2019.

Before the Federal Communications Commission, [From the Internet] https://ecfsapi.fcc.gov/file/0228024926034/FCC-18-17A1.pdf, 1-74.

Frazier, L. M."Radar surveillance through solid materials," in Command, Control, Communications, and Intelligence Systems for Law Enforcement, vol. 2938. International Society for Optics and Photonics, 1997, pp. 139-147.

Friis, H.T. "A note on a simple transmission formula," Proceedings of the IRE, vol. 34, No. 5, pp. 254-256, May 1946.

Tan, S. Y. et al., "A microcellular communications propagation model based on the uniform theory of diffraction and multiple image theory," IEEE Transactions on Antennas and Propagation, vol. 44, No. 10, pp. 1317-1326, Oct. 1996.

Harvey, J. et al., "Exploiting High Millimeter Wave Bands for Military Communications, Applications, and Design," IEEE Access, vol. 7, pp. 52 350-52 359, Apr. 2019.

Non Final Office Action for corresponding U.S. Appl. No. 16/422,517 dated Mar. 15, 2022.

O. Kanhere and T. S. Rappaport, "Position Locationing for Millimeter Wave Systems," in Proc. IEEE 2018 Global Communications Conference, Dec. 2018, pp. 1-6.

G. R. MacCartney, Jr. and T. S. Rappaport, "A flexible millimeter-wave channel sounder with absolute timing," IEEE Journal on Selected Areas in Communications, vol. 35, No. 6, pp. 1402-1418, Jun. 2017.

T. S. Rappaport et al., "Wireless Communications and Applications Above 100 GHz: Opportunities and Challenges for 6G and Beyond (Invited)," in IEEE Access, vol. 7, pp. 78729-28757, May 2019.

C. D. McGillem and T. S. Rappaport, "Infra-red location system for navigation of autonomous vehicles," in Proceedings. 1988 IEEE International Conference on Robotics and Automation, vol. 2, Apr. 1988, pp. 1236-1238.

G. R. MacCartney, Jr. et al., "Indoor office wideband millimeter-wave propagation measurements and models at 28 GHz and 73 GHz for ultra-dense 5G wireless networks (Invited Paper)," IEEE Access, vol. 3, pp. 2388-2424, Oct. 2015.

Y. Xing, O. Kanhere, S. Ju, and T. S. Rappaport, "Indoor Wireless Channel Properties at Millimeter Wave and Sub-Terahertz Frequencies: Reflection, Scattering, and Path Loss," in IEEE 2019 Global Communications Conference, pp. 1-6, Dec. 2019.

S. Ju et al., "Scattering Mechanisms and Modeling for Terahertz Wireless Communications," in 2019 IEEE International Conference on Communications (ICC), May 2019, pp. 1-7.

A. O. Kaya, L. Greenstein, D. Chizhik, R. Valenzuela, and N. Moayeri, "Emitter Localization and Visualization (ELVIS): A Backward Ray Tracing Algorithm for Locating Emitters," in 2007 41st Annual Conference on Information Sciences and Systems, Mar. 2007, pp. 376-381.

"Ieee standard for high data rate wireless multi-media networks—amendment 2: 100 GB/s wireless switched point-to-point physical layer," IEEE Std 802.15.3d-2017 (Amendment to IEEE Std 802.15.3-2016 as amended by IEEE Std 802.15.3e-2017), pp. 1-55, Oct. 2017.

Federal Communications Commission, "Use of Spectrum Bands Above 24 GHz For Mobile Radio Services:" Dec. 2018. [Online]. Available: https://docs.fcc.gov/public/attachments/FCC-18-180A1.pdf.

G. R. MacCartney, Jr. et al., "Millimeter wave wireless communications: New results for rural connectivity," in Proceedings of the 5th Workshop on All Things Cellular: Operations, Applications and Challenges: in conjunction with MobiCom 2016, ser. ATC '16. New York, NY, USA: ACM, Oct. 2016, pp. 31-36.

(56) References Cited

OTHER PUBLICATIONS

G. R. MacCartney and T. S. Rappaport, "Rural macrocell path loss models for millimeter wave wireless communications," IEEE Journal on Selected Areas in Communications, vol. 35, No. 7, pp. 1663-1677, Jul. 2017.
Wireless Communications and Applications Above 100 GHz: Opportunities and Challenges for 6G and Beyond (Invited), IEEE Access, Feb. 2019.
T. Kleine-Ostmann et al., "Measurement of channel and propagation properties at 300 GHZ," in 2012 Conference on Precision electromagnetic Measurements, Jul. 2012, pp. 258-259.
N. Khalid and O. B. Akan, "Wideband THz communication channel measurements for 5G indoor wireless networks," in 2016 IEEE International Conference on Communications (ICC), May 2016, pp. 1-6.
S. Ju. et al., "Scattering mechanisms and modeling for terahertz wireless communications," in in proceeding of 2018 IEEE International Conference on Communications (ICC), 2018.
J. Ma, R. Shrestha, L. Moeller, and D. M. Mittleman, "Channel performance for indoor and outdoor terahertz wireless links," APL Photonics, vol. 3, No. 5, pp. 1-13, Feb. 2018.
G. R. MacCartney and T. S. Rappaport, "A flexible millimeter-wave channel sounder with absolute timing," IEEE Journal on Selected Areas in Communications, vol. 35, No. 6, pp. 1402-1418, Jun. 2017.
O. Kanhere and T. S. Rappaport, "Position locationing for millimeter wave systems," in IEEE 2018 Global Communications Conference, Dec. 2018, pp. 1-6.
O. Kanhere, S. Ju, Y. Xing, and T. S. Rappaport, "Map Assisted Millimeter Wave Localization," in IEEE 2019 Global Communications Conference, pp. 1-6, Dec. 2019.
S. Sun, G. R. MacCartney, Jr., and T. S. Rappaport, "Millimeter-wave distance dependent large-scale propagation measurements and path loss models for outdoor and indoor 5G systems," in 2016 IEEE 10th European Conference on Antennas and Propagation (EuCAP), Apr. 2016, pp. 1-5.
I.F. Akyildiz, J. M. Jornet, and C. Han, "Terahertz band: Next frontier for wireless communications," Physical Communication, vol. 12, pp. 16-32, Sep. 2014.
M. J. W. Rodwell, Y. Fang, J. Rode, J. Wu, B. Markman, S. T. uran Brunelli, J. Klamkin, and M. Urteaga, "100-340GHz Systems: Transistors and Applications," in 2018 IEEE International Electron Devices Meeting (IEDM), Dec. 2018, pp. 14.3.1-14.3.4.
O. Kanhere, S. Ju, Y. Xing, and T. S. Rappaport, "Map Assisted Millimeter Wave Localization for Accurate Position Location," in IEEE Globecom, Dec. 2019, pp. 1-6.
M. J. W. Rodwell, "Sub-mm-wave technologies: Systems, ICs, THz transistors," in 2013 Asia-Pacific Microwave Conference Proceedings (APMC), Nov. 2013, pp. 509-511.
S. Ju et al., "Scattering Mechanisms and Modeling for Terahertz Wireless Communications," in Proc. IEEE International Conference on Communications, May 2019, pp. 1-7.
J. Zhou et al., "Integrated Full Duplex Radios," IEEE Communications Magazine, vol. 55, No. 4, Apr. 2017, pp. 142-151.
J. H. Reed, K. J. Krizman, B. D. Woerner, and T. S. Rappaport, "An overview of the challenges and progress in meeting the E-911 requirement for location service," IEEE Commun. Mag., vol. 36, No. 4, pp. 30-37, 1998.

* cited by examiner

SYSTEM, METHOD AND COMPUTER-ACCESSIBLE MEDIUM FOR REAL TIME IMAGING USING A PORTABLE DEVICE

CROSS-REFERENCE TO RELATED APPLICATION(S)

This application is a continuation-in-part, relates to and claims priority from U.S. patent application Ser. No. 16/422,517, filed on May 24, 2019, and also relates to and claims priority from U.S. Patent Application Nos. 63/148,103, filed on Feb. 10, 2021, 62/675,869, filed on May 24, 2018, 62/852,053, filed on May 23, 2019, and, the entire disclosures of all of which are incorporated herein by reference.

STATEMENT REGARDING FEDERALLY SPONSORED RESEARCH

This invention was made with government support under Grant Nos. 1909206 and 2037845, awarded by the National Science Foundation. The government has certain rights in the invention.

FIELD OF THE DISCLOSURE

The present disclosure relates imaging, and determining locations and presence and movement of items, individuals, or mobile devices more specifically, to exemplary embodiments of an exemplary system, method and computer-accessible medium for real time imaging of the environment and position location of a mobile or portable (e.g., moveable or attachable or handheld) device, with the assistance of one or more additional wireless devices, which may include one or more portable devices, base stations (BS) or Wi-Fi hotspots.

BACKGROUND INFORMATION

Today, many people use their smartphone camera to assist in the capture pictures of places that can be hard for them to see. For example, taking a photo of electronics wiring behind a hard to reach desk, or taking a photo in a cabinet that can be above the person's eyesight, facilitates the user to view a photo of the physical environment, without having to reach their own head behind the desk or to climb on a chair to see the cabinet's contents with their own eyes. To many, this can be a surprising and non-intuitive use of the smartphone camera that might not have been contemplated a decade ago. Nevertheless, it shows how handheld communication devices can be used for things beyond communication.

Radio frequencies ("RF") and/or Wi-Fi signals can be used to discern object locations in three-dimensional ("3-D") space, using sensing and predictive approaches based on the signals. Position location based on radio signal strength indication ("RSSI") can be used, but these methods suffer gross inadequacies due to limited RF bandwidth and without the high resolution that directional multi-element antenna arrays can provide. Additionally, physical obstructions in the environment can cause the distance-dependent degradation in RSSI to deviate from the mean path loss predicted by path loss models, leading to further inaccuracies in position location estimates.

Using various radar technologies, which can use a wider signaling bandwidth, it can be possible to determine smaller distance differences in the measurement of a returning radar images. In radio propagation channel sounding, a wider RF signaling bandwidth can lead to greater temporal resolution on the received probe signal when in a bi-static radar configuration.

Thus, it may be beneficial to provide an exemplary system, method, and computer-accessible medium for real time imaging and position location using a mobile or portable (e.g., moveable or attachable or handheld) device which can overcome at least some of the deficiencies described herein above.

SUMMARY OF EXEMPLARY EMBODIMENTS

The present application overcomes the deficiencies in the prior art, and further overcomes the issue of objects or people moving around which can further degrade inaccuracies by prior art systems that rely upon static or old information. An exemplary system, method and computer-accessible medium for generating an image(s) or a video(s) or machine readable representations or renderings of an environment(s), which can include, for example, generating a first radiofrequency (RF) radiation based on beam steering or frequency sweeping using a wireless transmitter, providing the first mmWave RF radiation to the environment(s), receiving, at the wireless receiver, a second mmWave RF radiation from the environment(s) that can be based on the first mmWave RF radiation, and generating the image(s) or the video(s) based on the second mmWave RF radiation. The second mmWave RF radiation may be the result of the first mmWave RF radiation suffering one or more reflections or scattering events off materials in the environment. In some exemplary embodiments of the present disclosure, the wireless receiver can receive more than one RF radiations from the environment based on the first mmWave RF radiation from the wireless transmitter. The multiple RF radiations, called multipath components, can assist in the position location of the mobile device. In some exemplary embodiments of the present disclosure, the wireless transmitter and receiver may be the same wireless device. In some exemplary embodiments, the transmitter and receiver may be separate wireless devices.

In some exemplary embodiments of the present disclosure, the video(s) can be a real-time video of the environment(s). The first mmWave RF radiation can have a frequency between about 200 MHz to about 3 THz. Information related to a phase(s) of the second mmWave RF radiation, a time of arrival of the second mmWave RF radiation, a relative time of arrival of the second mmWave RF radiation, or an angle of arrival of the second mmWave RF radiation can be determined. The image(s) or the video(s) can be determined based on the information. A location or position of objects in the environment can be determined, which can include (i) obstructions, (ii) walls, (iii) objects of interest, or (iv) people. The position of the wireless transmitter and/or wireless receiver can be determined based on the information related to a phase(s) of the second mmWave RF radiation, a time of arrival of the second mmWave RF radiation, a relative time of arrival of the second mmWave RF radiation, or an angle of arrival of the second mmWave RF radiation, using pictures or videos of the environment.

In certain exemplary embodiments of the present disclosure, a movement of an object(s) in the environment and the wireless transmitter and/or wireless receiver can be tracked based on the second mmWave RF radiation or a location of the wireless transmitter and/or wireless receiver can be determined based on the second mmWave RF radiation.

Information regarding the second mmWave RF radiation can be transmitted to a further device, and the image(s) or the video(s) can be received from the further device. The first mmWave RF radiation can be generated using an adaptive antenna array, where the adaptive antenna array includes one of a digital antenna array, an analog antenna array, or a hybrid antenna array. A direction of transmission of the adaptive antenna array can be modified based on the environment(s). The image(s) or the video(s) can be generated based on the multipath components using a machine learning procedure.

In some exemplary embodiments of the present disclosure, the first mmWave RF radiation can be pulsed, spread over a bandwidth, or discretized over a plurality of individual frequencies. A location of a stud(s) in a wall(s) can be determined based on the second mmWave RF radiation. A map(s) of the environment(s) can be generated based on the second mmWave RF radiation or it can be received, wherein the map(s) includes a floor plan, locations of walls or locations of objects. The received map(s) can be generated by a cloud server. A phase(s) of the multipath components can be determined and a distance between the wireless transmitter(s) and a receiving device can be determined based on the phase(s). A phase ambiguity in phase(s) of the multipath components can be corrected for. In other embodiments of the present disclosure, the distance may be determined based on the time(s) of flight of the RF radiation. A scattering pattern(s) of different angles of receipt of the multipath components can be determined by a receiving device.

Additionally, an exemplary wireless transmitter can be provided, which can include, for example, an antenna array(s), and a computer hardware arrangement configured to generate radiofrequency (RF) radiation using the antenna array(s), provide the first mmWave RF radiation to an environment(s), receive, using the antenna array(s), a multipath components from the environment(s) that can be based on the first mmWave RF radiation, and generate the image(s) or the video(s) based on the second mmWave RF radiation.

In some exemplary embodiments of the present disclosure, the video(s) can be a real-time video of the environment(s). The first mmWave RF radiation can have a frequency between about 200 MHz to about 3000 GHz. Information related to a phase(s) of the second mmWave RF radiation, a time of arrival of the second mmWave RF radiation, a relative time of arrival of the second mmWave RF radiation, or an angle of arrival of the second mmWave RF radiation can be determined. The image(s) or the video(s) can be determined based on the information. A presence or a location of an object(s) in the environment(s) can be determined based on the second mmWave RF radiation.

In certain exemplary embodiments of the present disclosure, a movement of an object(s) in the environment can be tracked based on the second mmWave RF radiation. Information regarding the second mmWave RF radiation can be transmitted to a further device, and the image(s) or the video(s) can be received from the further device. The first mmWave RF radiation can be generated using an adaptive antenna array, where the adaptive antenna array includes one of a digital antenna array, an analog antenna array, or a hybrid antenna array. A direction of transmission of the adaptive antenna array can be modified based on the environment(s). The image(s) or the video(s) can be generated based on the second mmWave RF radiation using a machine learning procedure.

In some exemplary embodiments of the present disclosure, the videos can be generated by light detection and ranging techniques (e.g., LIDAR), wherein a 2D or 3D model of the environment can be created.

In some exemplary embodiments of the present disclosure, a pre-existing map of the environment can exist. The pre-existing map, for example, can be drawn in a computer-aided design (CAD) software application, hand drawn, or floorplans or blueprints of the building. The pre-existing map of the environment can be directly used for localization of the mobile device.

In some exemplary embodiments of the present disclosure, computing capabilities of the wireless transmitter and/or wireless receiver can facilitate mapping and ray tracing in real time. In some exemplary embodiments of the present disclosure, the wireless transmitter and/or receiver can generate a map of the environment on the fly or have maps loaded within, thereby facilitating map-based localization algorithms that exploit real-time multipath propagation. In some exemplary embodiments of the present disclosure, the augmentation of human and computer vision can allow users to see in the dark and see through walls. In some exemplary embodiments of the present disclosure, the wireless transmitter and/or receiver can download or generate a map of the environment on the fly and "see in the dark".

According to some exemplary embodiments of the present disclosure, the wireless transmitter and/or receiver can behave similar to a radar, e.g., measuring the distances of prominent features in the environment, such as walls, doors, and other obstructions. Additionally, reflections and scattering off walls can facilitate wireless transmitter and/or receiver(s) to view objects around corners or behind walls, as illustrated in, e.g., FIG. 2. In some exemplary embodiments of the present disclosure, for ranging measurements, a radar can operate in the pulsed radar mode, wherein the radar can transmit a single pulse, switch from transmit to receive mode, and wait for the echo back from the object that is to be range-estimated. However, due to constraints on switching speed, e.g., objects at a sufficient distance from the user may be ranged. For example, an mmWave phased array with a TX-RX switching time of ~100 ns may not range objects closer than 50 ft (electromagnetic waves travel 1 ft/ns). To range closer objects, a UE may simultaneously transmit and receive the radar signal, operating in the full duplex mode, requiring TX-RX isolation.

An exemplary system, method and computer-accessible medium for selecting at least one location of (i) at least one receiver or transceiver or (ii) at least one transmitter or transceiver, can include, for example, facilitating a receipt, from the at least one transmitter or transceiver, of a plurality of signals by the at least one receiver or transceiver, wherein each of the signals may have a multipath component; determining time of flight (ToF) information and angle of arrival (AoA) information of the multipath components present in the signals; determining one or more possible locations of (i) the at least one receiver or transceiver or (ii) the at least one transmitter or transceiver based on the ToF information, the AoA information, and a model of physical surroundings; and selecting the at least one location of (i) the at least one receiver or transceiver or (ii) the at least one transmitter or transceiver based on the one or more possible locations.

In some exemplary embodiments of the present disclosure, the plurality of signals can be radiofrequency (RF) signals. In some exemplary embodiments of the present disclosure, the RF signals can be millimeter wave (mmWave) signals. In some exemplary embodiments of the present disclosure, the plurality of signals can be at least one of (i) acoustic signals, (i) audio signals, (iii) optical signals, or (iv) sonar signals.

In some exemplary embodiments of the present disclosure, an exemplary model of the physical surroundings can be generated using at least one of: one or more video recordings of an environment obtained using a visible-light camera, one or more pictures of the environment obtained using the visible-light camera, one or more light detection and ranging (LIDAR) techniques to generate a 2D model or a 3D model of the environment, a radiofrequency (RF) radar, a computer-aided design (CAD) software application, a hand drawing, or floorplans or blueprints of a building.

In some exemplary embodiments of the present disclosure, at least one of the signals can be provided at least one of (i) at a frequency in a range of approximately 200 MHz to 3 THz, or (ii) with a bandwidth of approximately 100 MHz to 10 GHz. In some exemplary embodiments of the present disclosure, the determination of the one or more possible locations can be performed by comparing the at least one possible location with the ToF information and the AoA information. In some exemplary embodiments of the present disclosure, the determination of the one or more possible locations can be performed using at least one site-specific computer rendered simulation at least one of: in real-time, by a cloud server, on the at least one receiver or transceiver, or on the at least one transmitter or transceiver. In some exemplary embodiments of the present disclosure, the at least one transmitter or transceiver is a portable device, base station, or a wifi hotspot and at least one receiver or transceiver is a mobile or portable (e.g. moveable or attachable or handheld) device.mobile or portable (e.g., moveable or attachable or handheld).

In some exemplary embodiments of the present disclosure, the method and computer-accessible medium can further provide for facilitating a cooperative localization as a function of the determination of the at least one possible location. In some exemplary embodiments of the present disclosure, the model of the physical surroundings can be determined prior to facilitating the reception of at least one of the signals. In some exemplary embodiments of the present disclosure, at least one of (i) the at least one receiver or transceiver or (ii) the at least one transmitter or transceiver can be movable or fixed to a specified location. In some exemplary embodiments of the present disclosure, the determination of the one or more possible locations can be performed by a computer arrangement which can be at least one of (i) a fixed or mobile system provided at a wireless transmitter, (ii) a fixed or mobile system provided at a wireless receiver, or (iii) a cloud computing system.

In some exemplary embodiments of the present disclosure, the method and computer-accessible medium can further provide for determining at least one of a position, a velocity or an acceleration of at least one of (i) the at least one receiver or transceiver or (ii) the at least one transmitter or transceiver using, for example, a Kalman filter, an extended Kalman filter, or a particle filter.

In some exemplary embodiments of the present disclosure, the method and computer-accessible can further provide for selecting of the at least one location of the at least one receiver or transceiver can be based on at least one of: a least-squares metric, or clustering the one or more possible locations and selecting a cluster containing a maximum number of the one or more possible locations.

In some exemplary embodiments of the present disclosure, the method and computer-accessible medium can further provide for determining a carrier phase of at least one of the multipath components, wherein the carrier phase can be used in conjunction with at least one of the AoA information or the ToF information of the multipath components to determine the at least one location of at least one of (i) the at least one receiver or transceiver or (ii) the at least one transmitter or transceiver.

In some exemplary embodiments of the present disclosure, the AoA information can be determined using a phased antenna array provided at a location of at least one of (i) the at least one receiver or transceiver or (ii) the at least one transmitter or transceiver.

In some exemplary embodiments of the present disclosure, the method and compute-accessible medium can further provide, with onboard sensors, determining at least one of: an orientation of at least one of (i) the at least one receiver or transceiver or (ii) the at least one transmitter or transceiver, or z-coordinates of at least one of (i) the at least one receiver or transceiver or (ii) the at least one transmitter or transceiver.

In some exemplary embodiments of the present disclosure, the onboard sensor which determines the orientation can be at least one of a gyroscope or an accelerometer. In some exemplary embodiments of the present disclosure, the onboard sensor used to determine the z-coordinates can be a barometer.

In some exemplary embodiments of the present disclosure, the at least one location can be selected based on a lookup table which includes the AoA information and the ToF information measured at calibrated a location in a surveyed environment. In some exemplary embodiments of the present disclosure, at least one of the signals can be at least one of (i) a pulsed signal, (ii) a signals that can be spread over a bandwidth, or (iii) a signal that discretized over a plurality of individual frequencies.

An exemplary system, method and computer-accessible medium for selecting at least one location of (i) at least one receiver or transceiver or (ii) at least one transmitter or transceiver, can include, for example, facilitating a receipt, from the at least one transmitter or transceiver, of a plurality of signals by the at least one receiver or transceiver, wherein each of the signals has a multipath component; determining time of flight (ToF) information and angle of arrival (AoA) information of the multipath components present in the signals; determining one or more possible locations of (i) the at least one receiver or transceiver or (ii) the at least one transmitter or transceiver based on the ToF information, the AoA information, and a model of physical surroundings; and selecting the at least one location of (i) the at least one receiver or transceiver or (ii) the at least one transmitter or transceiver based on the one or more possible locations.

An exemplary system, method and computer-accessible medium for selecting at least one location of (i) at least one receiver or transceiver or (ii) at least one transmitter or transceiver, can include, for example, at least one processor which is configured to: determine time of flight (ToF) information and angle of arrival (AoA) information of the multipath components present in the signals, and determine one or more possible locations of (i) the at least one receiver or transceiver or (ii) the at least one transmitter or transceiver based on the ToF information, the AoA information, and a model of physical surroundings, wherein the at least one location of (i) the at least one receiver or transceiver or (ii) the at least one transmitter or transceiver is selectable based on the one or more possible locations.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
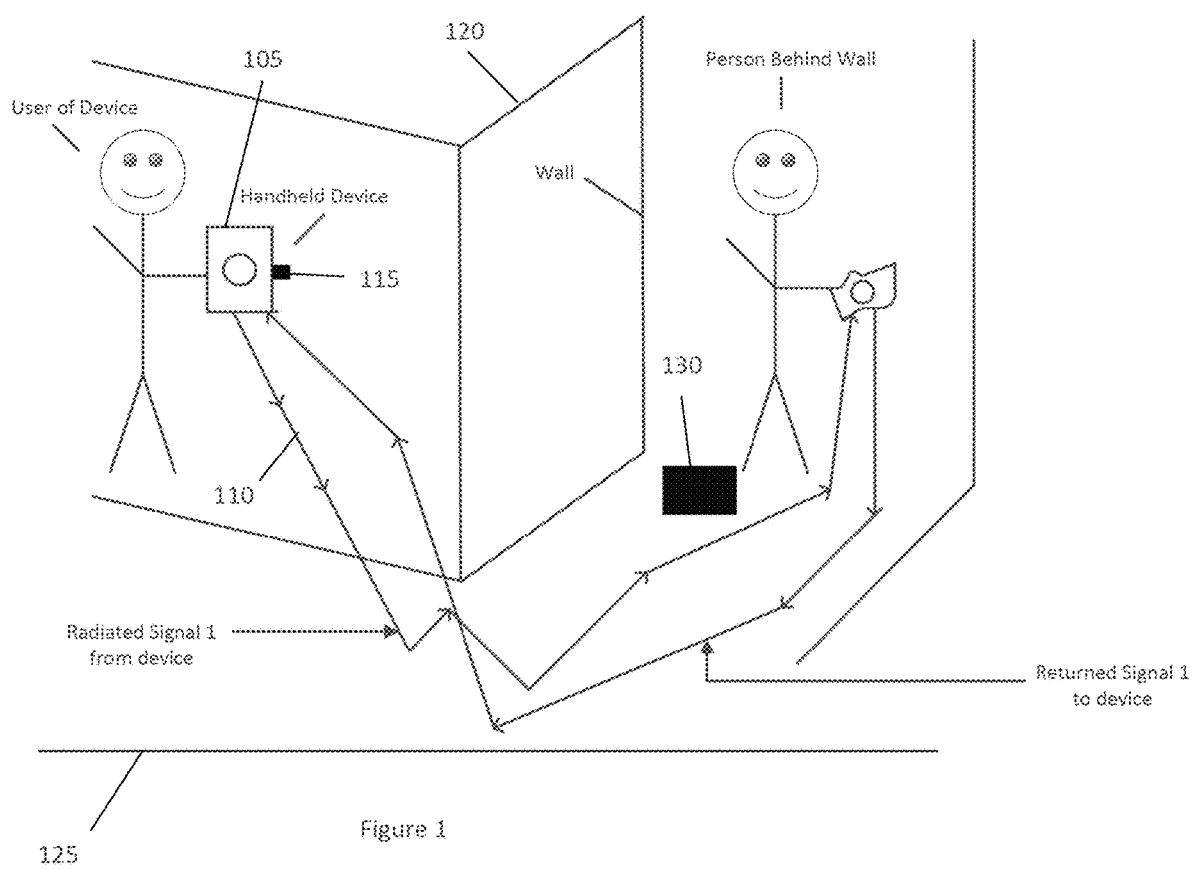
FIG. 1 is an exemplary diagram of an exemplary portable device interacting with a physical environment according to an exemplary embodiment of the present disclosure.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

The exemplary system, method, and computer-accessible medium, according to an exemplary embodiment of the present disclosure, can include a a mobile or portable (e.g., moveable or attachable or handheld) device that can utilize wide bandwidths for cellular or personal/unlicensed wireless communication, and which can use those wide bandwidths to provide real time imaging data for a user of a mobile device such that the radio electronics incorporated for communication can also be used for providing 3D imaging using wideband radar-like transmissions, and then using the display or sensors on the hand held device to render a likeness of the image, even when the human user, itself, cannot see or predict the surroundings of the physical environment.

Detecting the phase or the time of arrival or the relative time of arrival or the angle of arrivals of discernable angles of radio energy and radio signatures can facilitate the determination of the presence and location of an object, can be used to track movement of items or individuals, and can determine relative motion and changes in orientation or position or location of the items or the individuals, without requiring any active components on the item or individual being tracked. Additionally, the position of the mobile device can be, e.g., determined and tracked using the time of arrival or the relative time of arrival or the angle of arrivals of discernable angles of radio energy and radio signatures. Tracking of the position of the mobile device can be performed, for example, by using an extended Kalman filter (EKF). The exemplary system, method and computer-accessible medium can incorporate and/or utilize movement of the exemplary mobile device (e.g., various positions and angles) in order to more accurately determine the position of the mobile device and/or generate an image of the surroundings.

The exemplary system, method, and computer-accessible medium, according to an exemplary embodiment of the present disclosure, can estimate the velocity of the mobile device, for example, by measuring the doppler shift in the first RF transmission, or with onboard gyroscopes, accelerometers and other sensors on the mobile device.

Alternatively or in addition, the exemplary system, method, and computer-accessible medium, according to an exemplary embodiment of the present disclosure, can estimate the orientation of the mobile device with onboard sensors, e.g., gyroscopes, accelerometers. Gyroscopes can measure the angular velocity of the mobile device, from which the orientation of the mobile device can be obtained by integration. Accelerometers can provide an estimate of the tilt of the mobile device with respect to the vertical axis. The exemplary system, method, and computer-accessible medium, according to an exemplary embodiment of the present disclosure, can include and/or utilize an extended Kalman filter (EKF) which can be a recursive low pass filter that smoothens the error in the position of the mobile device being tracked. The exemplary system, method, and computer-accessible medium, according to an exemplary embodiment of the present disclosure, can combine exemplary measurements from different sources (e.g., angular measurements, temporal measurements, GPS measurements) by the filter, while minimizing the variance of the expected position location error.

The exemplary system, method and computer-accessible medium, according to an exemplary embodiment of the present disclosure, can determine the position of one or more objects in the environment. The position can be an absolute position of the object (e.g., based on a priori knowledge of the environment which can have been previously determined). Alternatively, the position can be a relative position of the object with respect to the mobile device. For example, the distance, angle, and height from each object can be determined relative to the mobile device. Additionally, various other suitable exemplary position/information sensors can be utilized, which can be incorporated in the mobile device. These can include, but are not limited to barometers, gyroscopes, capacitive sensors, transducers, video camera, as well as inertial navigations procedures. Alternatively, or in addition, a position of the mobile device can be determined. Then using the a priori knowledge of the environment, the absolute position of each object can be determined.

After the position of each object is determined, the exemplary system, method and computer-accessible medium, according to an exemplary embodiment of the present disclosure, can generate an image, a video or a map of the environment. For example, the relative or absolute position of each object can be used to render the image (e.g., by providing the location for each object in the image). Additionally, surface characteristics of each object can be utilized along with the position to more accurately render the image, video or map. Various exemplary machine learning procedures can be utilized to determine the type of object being imaged. This information can be incorporated into the image, video, or map to provide increased accuracy. For example, by identifying the actual object, known characteristic of the object type can be used as parameters to render the actual object being imaged into the image, video, or map. Further, frequency sweeping can be used to fine tune the focus of the image to be captured or determined. The user device can perform this using barometers, gyroscopes, capacitive sensors, and other known position location mechanisms that can be incorporated into a mobile device.

By using wireless communication spectrum that can be in the millimeter wave or even higher frequency range, for example, of about 10 GHz (e.g., between 8 GHz to about 12 GHz) up to and including about 3000 GHz (e.g., about 2700 GHz to about 3300 GHz)), it can be possible to use the smaller wavelengths and greater allocated spectrum bandwidths (e.g., RF bandwidths of 2 GHz up to and including 100 GHz of width), to yield super-resolution range finding, imaging, motion detection, rendering of the physical environment, even when there can be an obstructed view of a physical space, or if there can be insufficient light for the human to discern any of these kinds of cues in the environment. Additionally, certain frequency ranges can be particularly beneficial (e.g., about 80 GHz to about 900 GHz, and, according to various exemplary embodiments of the present disclosure, frequencies below 80 GHz can be utilized as well. The processing for such unprecedented imaging and rendering can be done on the device (e.g., based on Moore's law—the computational capacity of mobile devices can grow exponentially), or can be shared between the device itself and processing that can be performed remote to the device, using the wide bandwidths of wireless networks.

Additionally, exemplary computation can be performed remotely from the device, and sent back to the device for storage, manipulation, augmentation, or iterative cooperative processing between the device, the human user of the device, and one or more computing engines remote to the device. Smaller wavelengths at greater wireless carrier frequencies between about 10 GHz and 3000 GHz can facilitate the use of physically small adaptive antenna arrays, which can be digital, analog, or hybrid in their use of beamforming.

At various exemplary frequencies, each antenna element can be quite small (e.g., on the order of a wavelength or even smaller if implemented on high dielectric materials such as on-chip antenna, on substrate antennas, or antennas implemented on high epsilon circuit boards, or on the skin of fabric of a device). At 10 GHz, the free space wavelength can be 30 millimeters (e.g., 3 cm), and at 3000 GHz, the free space wavelength can be 0.1 millimeter, thus illustrating that hundreds or thousands or more antenna elements can easily fit on a mobile or portable (e.g., moveable or attachable or handheld) device at such frequencies, providing super angular and spatial and temporal resolution for a wideband signal that can be emitted by such a wireless devices. Similarly, at such high carrier frequencies, the narrowband bandwidth can be quite large (e.g., a few percent of the carrier frequency at 3000 GHz can be an astounding 90 GHz) thereby facilitating low cost electronics, many with resonant circuits, and reliable and reproducible "narrowband processing" electronics over unprecedented wide RF bandwidths about an unprecedentedly high carrier frequency, and thus can provide extremely good precision and relative accuracy for measuring relative distances through time delay detected from signals that can be reflected or scattered from the physical environment.

Figure 13:
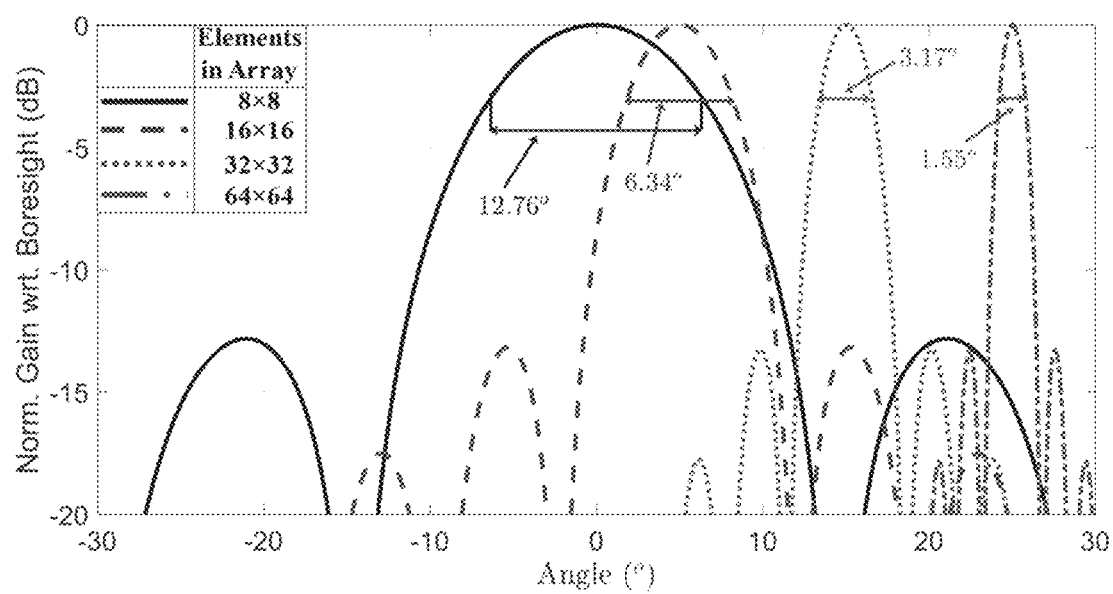
FIG. 13 is an exemplary normalized antenna gain according to an exemplary embodiment of the present disclosure.

In some exemplary embodiments of the present disclosure, the short wavelength in the mmWave frequency band can allow electrically large (but physically small) antenna arrays to be deployed at both the UE and BS. MmWave BS antenna arrays with 256 antenna elements and 32-element mobile antenna arrays are already commercially available. The frequency-independent half-power beamwidth (HPBW) of a uniform rectangular array (URA) antenna with half-wavelength element spacing can be approximately $(102/N)°$, where N is the number of antenna elements in each linear dimension of the planar array, as shown in, e.g., FIG. 13. FIG. 13 illustrates an exemplary normalized antenna gain (with respect to boresight, the axis of maximum gain) of URAs with 8×8, 16×16, 32×32, and 64×64 array elements. In these exemplary embodiments, the half power beamwidths (HPBWs) are 12.76°, 6.34°, 3.17°, and 1.55°, respectively.

Narrower HPBWs of antenna arrays can facilitate the AoA of received signals to be estimated precisely, and further signal processing provides better accuracy. For example, the sum-and-difference for an infrared system technique achieved sub-degree angular resolution with two overlapping and slightly offset antenna arrays, showing it is possible, e.g., to very accurately detect precise AoA at UEs or BSs.

By sending a RF transmission, either pulsed, spread over bandwidth, or discretized over many individual frequencies, using an exemplary modulation procedure that can be used to carry baseband signals over a carrier, the mobile or portable (e.g., moveable or attachable or handheld) device, such as a cellphone, communicator, all-purpose electronic wallet etc. can radiate energy in time and space, such that returned backscatter, reflection, and scattered signal energy radiated by the mobile or portable (e.g., moveable or attachable or handheld) device can be processed, at the device itself or remotely at a network computation site or other remote processing center, and then rendered by the mobile or portable (e.g., moveable or attachable or handheld) device for the user to assimilate. Alternatively, one or more wireless transmitters (for example base stations, wifi hotspots, or portable devices) could send a RF transmission, which could be processed by the mobile or portable device or remotely at a network computation site or other remote processing center and then rendered by the mobile or portable (e.g., moveable or attachable or handheld) device for the user to assimilate.

The exemplary mobile or portable (e.g., moveable or attachable or handheld) imaging device can be integrated in a cellphone, personal appliance, electronic wallet, or could be a standalone item such as a wallboard stud finder found in today's hardware stores. When implemented as part of a smart phone or pocket communicator, the preferred implementation, the device can use, for example, frequencies that are the same, similar or different than commercial wireless frequencies used for cellphone or Wi-Fi or ultrawideband, or Bluetooth communication.

The exemplary mobile or portable (e.g., moveable or attachable or handheld) device can include a viewing screen for rendering a photo or moving image or virtual view of the physical environment for the human user, as well as one or more cameras, and can include augmented reality to superimpose sensed data with actual data captured by the camera(s) or rendered photo. Even without a camera or image rendering screen capability, the exemplary device can use audio tones, alerts, text, or other means to communicate sensory observations to the user.

FIG. 1 is an exemplary diagram of an exemplary portable device interacting with a physical environment according to an exemplary embodiment of the present disclosure. As shown in FIG. 1, the exemplary mobile or portable (e.g., moveable or attachable or handheld) device (e.g. 105) can send out RF signals 110 of wide bandwidth (e.g., between about 2 to about 90 GHz in RF bandwidth for super resolution in space, as well as between about 6 GHz to about 3 THz), using carrier frequencies of, for example, 10 GHz up to 3000 GHz, and through the systematic transmission and reception of RF energy received back from the physical environment. The exemplary mobile or portable (e.g., moveable or attachable or handheld) device device 105 can use the imaging data from many locations in the physical space to create an image of the physical environment. The exemplary device can use a transceiver 115, or separate receiver and transmitter 115, which can be coupled to an electronically steered antenna array consisting of one or more antenna elements that can form beams of energy for transmission and reception.

The exemplary device can become a rendering device that can determine and show the user the physical surroundings of places that the human user cannot see for themselves, determining what can be behind walls 120, floors 125 or objects 130, determining the environment in the dark, augmenting an existing photo or known environment from a map or picture or past rendering stored or retrieved by the mobile or portable (e.g., moveable or attachable or handheld) device 105. The wireless device 105 can also provide computing based on sensors on the phone, or can have assisted computing for such rendering sending to remote processing units that can communicate with the exemplary mobile or portable (e.g., moveable or attachable or handheld) device, facilitating the device to show or store the image, and facilitating the user or the device to manipulate, zoom, highlight, shade, reorient/tilt either on the image displayed on the device in real time, or in pseudo real time with successive processing on the fly on the device or with data representing the measured sensory data and imaging sent back from the exemplary mobile or portable (e.g., moveable or attachable or handheld) device to remote computing resources that can be accessed through an existing wireless communication network.

Figure 2:
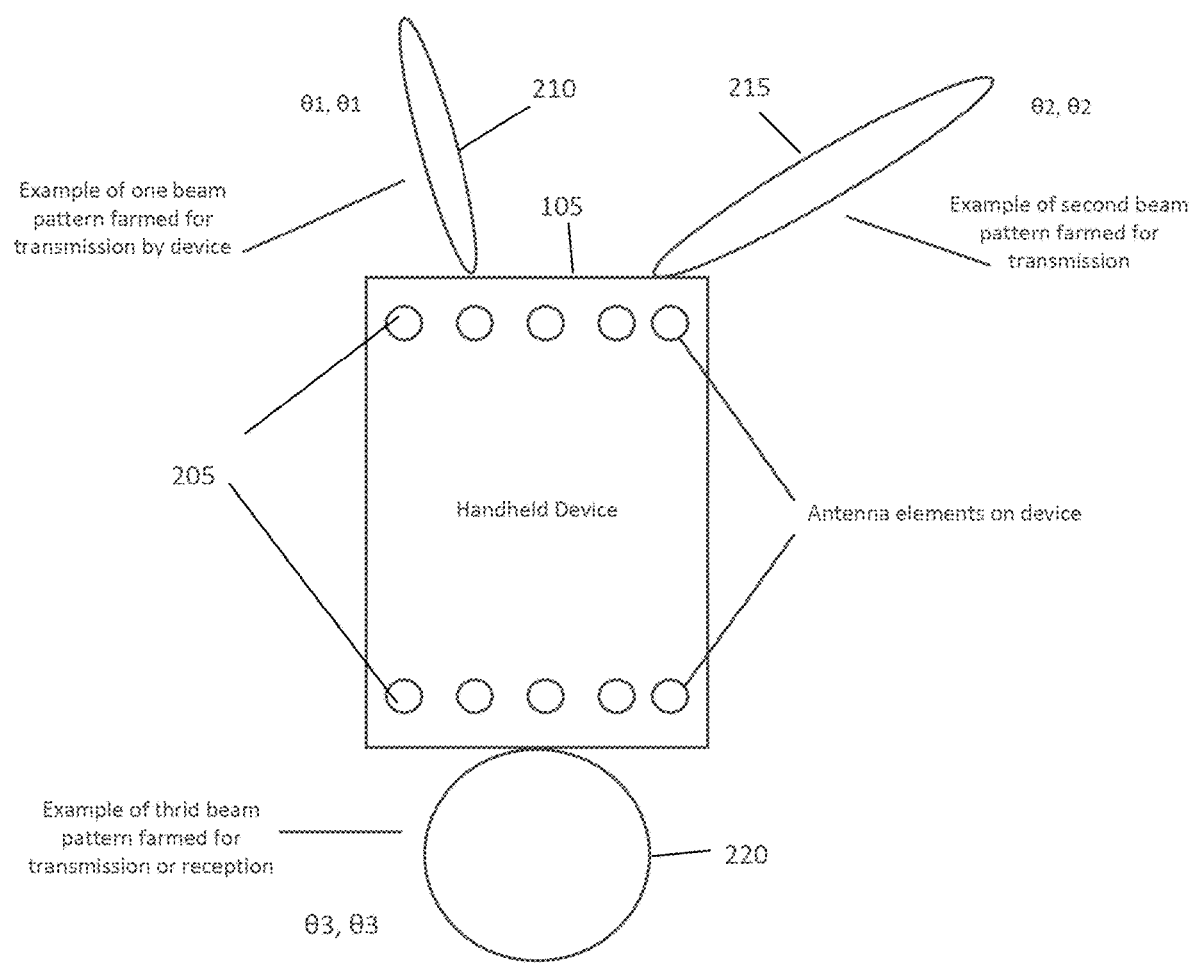
FIG. 2 is an exemplary diagram of exemplary antennas implemented on the exemplary device illustrating how signals can interact with an environment according to an exemplary embodiment of the present disclosure.

As shown in FIG. 2, more than one antenna 205 on the mobile or portable (e.g., moveable or attachable or handheld) device 105 can form beams of energy for transmission and reception, and these beams can be formed in parallel, or can be formed in sequential scans in azimuth and elevation, and the beam patterns made for transmission can be course (e.g., wide beam) and electronically shifted to become more fine (e.g., narrow) in beamwidth. Beamforming can facilitate for one main lobe, and/or many lobes, with varying degree of sidelobes, and that the antenna elements used for imaging the environment can be the same or different or partially shared with those used for wireless communications.

As shown in FIG. 2, either 2D azimuthal or elevation scans can be performed using the exemplary adaptive antennas for sensing the physical environment, or 3D in both azimuth and elevation can be performed, where scans can be variably oriented based on the handheld orientation and the desired orientation by the human user, etc. The radio signals 210 and 215 emitted and received by the exemplary device can be limited by the radio transmitter power, and enhancement in signal range can be achieved through averaging over time, frequency, code, space, and other exemplary procedures, and the narrow beams provided by a large antenna array can overcome free space propagation loss in the vicinity of the handheld device, thereby facilitating relatively long (e.g., one to many tens of meters) of range in proximity of the handheld device at low battery power levels typically used for smartphones. Different radio frequencies can scatter, reflect, diffract, or penetrate different materials at different frequencies. By using an exemplary model of such electromagnetic properties as a function of frequency of operation, the exemplary device can transmit and receive at many closely spaced angular dimensions to obtain get a very fine resolution model of the physical environment, where the time delays of different returning signals can facilitate computation of the physical distances associated with physical objects in the environment. Strength of signals can degrade when passing through walls or traveling through fog or rain, facilitating both physical objects as well as weather and atmospheric changes to be detected and imaged.

Some frequency bands, such as 70 GHz and 140 GHz, can have less attenuation in free space than other bands, such as 60 GHz or 380 GHz. Angular spacings can be synthesized on the transmitting phased array antennas using particular geometries (e.g., patch arrays, uniform linear arrays, uniform rectangular arrays, closely spaced arrays that take advantage of spatial relativity for improving signal to noise ratio and reducing sampling resolution requirements, conformal arrays, and on-chip and flip-chip phased arrays. The angular resolution and pointing angles can be determined by the amplitudes and/or phases of electrical signals applied to the transmitting antennas, and receiving antennas, which can be the same or different structures. Exemplary antenna architectures can include analog beamforming, digital beamforming, or hybrid beamforming. By transmitting a signal at different frequencies, and determining the frequency-dependent characteristics of the channel (e.g. the air, response of objects and humans, and the frequency-dependent nature or wavelength-dependent nature of various propagation phenomena, such as Brewster angle/polarizing angle), such that different reflection or scattering mechanisms can be identified from particular objects or phenomena, the exemplary system, method and computer-accessible medium can learn and determine what objects can exist in the channel, and where they can exist relative to other objects, based on time of flight of particular signatures measured in the channel.

Figure 3:
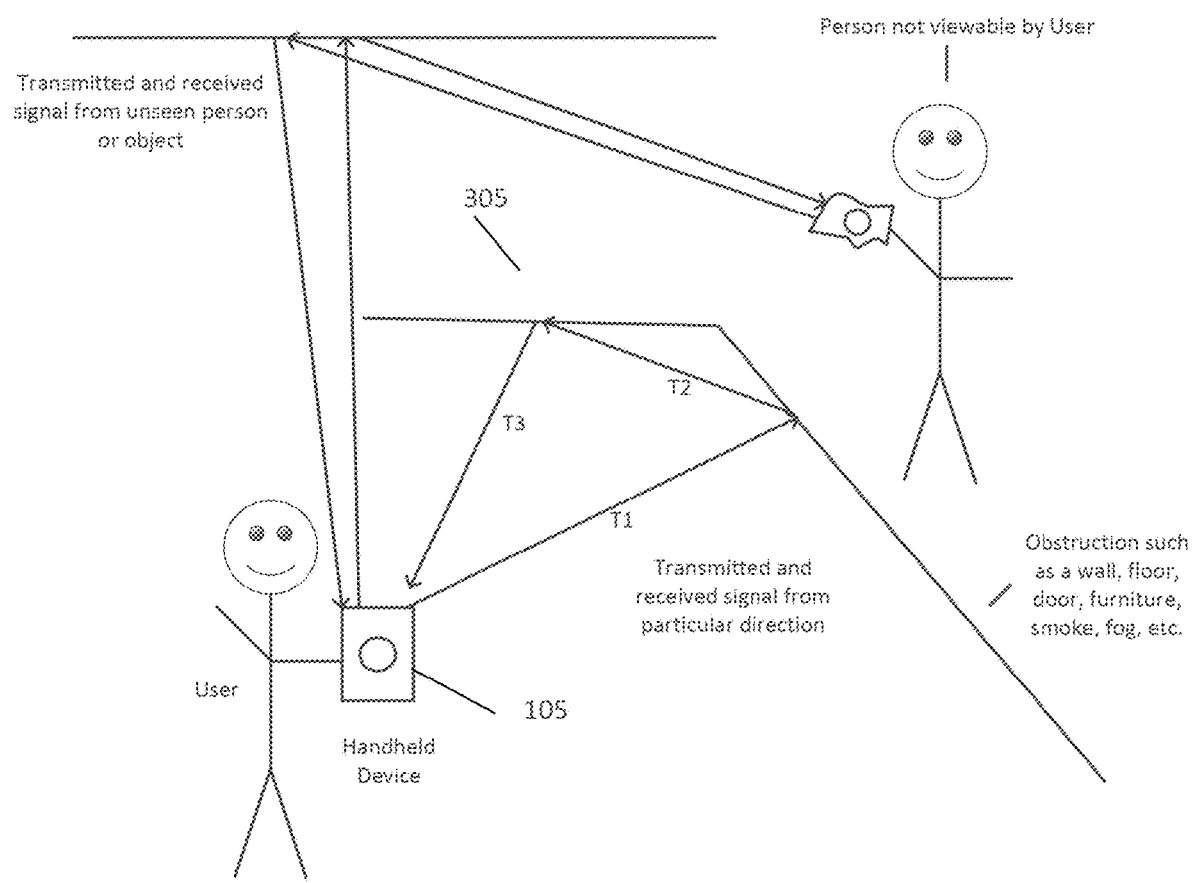
FIG. 3 is an exemplary diagram illustrating how the delay in propagating signals can relate to distance measured for a given beamforming orientation and transmitted signal according to an exemplary embodiment of the present disclosure.

FIG. 3 shows an exemplary diagram illustrating how the transmitted signal from the mobile or portable (e.g., moveable or attachable or handheld) device 105 can interact with the physical environment 305, facilitating the received version of the signal to be captured by the receiver in the mobile or portable (e.g., moveable or attachable or handheld) device. By capturing thousands of incremental versions of the electromagnetic responses of the physical environment 305 as a function of position in space, and by determining signaling over many samples of different locations in space, sufficient data can be obtained in which the exemplary system, method and computer-accessible medium can use to interpret the physical environment and received radio signals in order to form a rendering of the environment on the device for the user to view and interact with. Since reflections and scattering of RF energy can "go around corners and behind walls", and often energy can pass through walls with various attenuation characteristics, the exemplary system, method and computer-accessible medium can reconstruct an accurate estimate of the physical environment without the human user being able to see the environment, itself. Since RF energy can propagate whether there can be daylight or illumination or not, the exemplary system, method and computer-accessible medium can be used to see in the dark.

Additionally, the exemplary system, method and computer-accessible medium, according to an exemplary embodiment of the present disclosure, can be used to determine fog or smoke or rain or hail, as well as the characteristics of building materials and human reflectivity, and can have various attenuation and electromagnetic properties that can be modeled and incorporated into assessing the physical environment. Use of antenna polarization in the transmission and reception can facilitate the determination of the physical environment as many objects can be sensitive to polarization. Using previously determined versions of the physical environment, based on the location of the device and known maps and images for such location, the exemplary device can more easily predict the physical environment than just through RF imaging, alone.

Exemplary antenna polarizations can be altered by applying RF energy to orthogonally fabricated antenna elements on the antenna array, or using alternately oriented spatial arrays, for example, with different linear arrays that can be positioned in orthogonal axes on the device. Circular polarization, either right-handed or left-handed, can be excited by using phase delays on both horizontal and vertically oriented arrays, and circular polarization can be used to remove or attenuate various exemplary multipath components (e.g., through reverse circular polarization on reflection) that can bounce off floors or other surfaces, as well as other suitable procedures. Using various polarizations and frequencies, and incorporating channel sounding with alternate polarizations and alternate handed circular polarization, the exemplary system, method and computer-accessible medium can identify various surfaces, which can be learned over time for accurate sensing of the environment and creation of a map of locations of objects, items or people. For example, the exemplary system, method and computer-accessible medium, according to an exemplary embodiment of the present disclosure, can be used to identify different objects, people, clothing, inanimate objects, etc.

Figure 4:
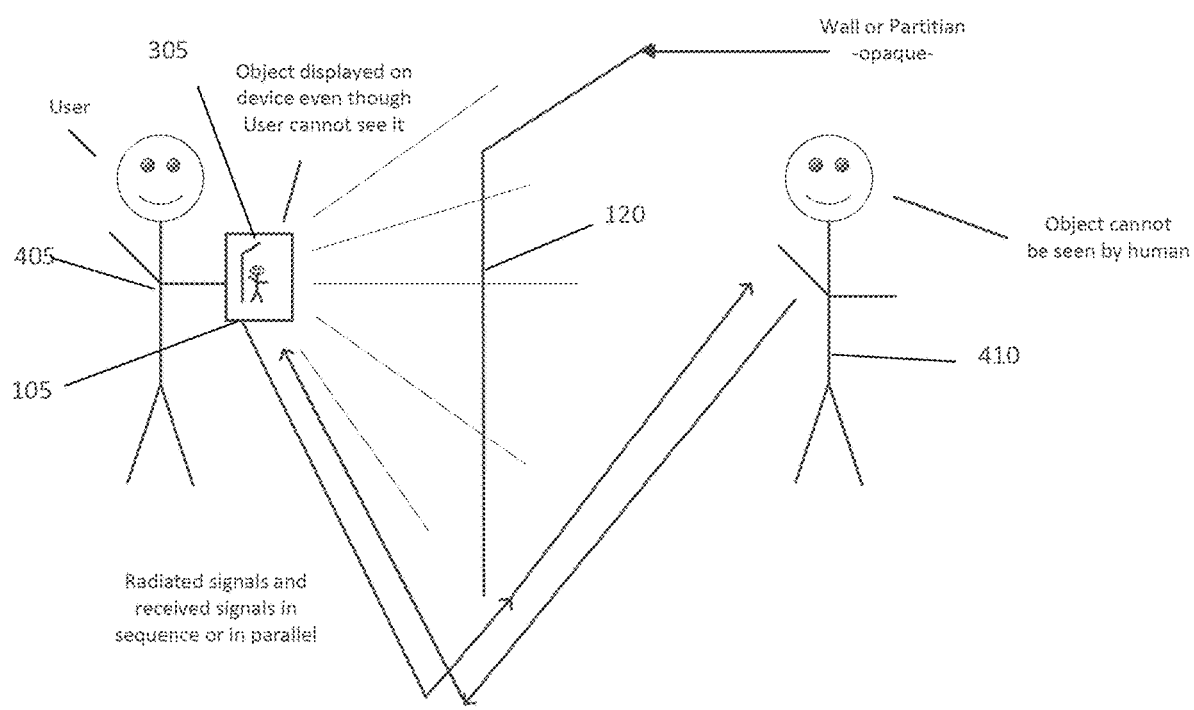
FIG. 4 is an exemplary diagram illustrating the rendering of a physical environment on an exemplary handheld display according to an exemplary embodiment of the present disclosure.

FIG. 4 illustrates how the exemplary mobile or portable (e.g., moveable or attachable or handheld) device 105 can show to a user 410 the rendering of the physical environment 305, even though the user cannot see the physical environment 305. In this exemplary scenario, a person 410 can be situated behind the wall 120, and the user 405 cannot see through the wall 120, but the device 105 can predict and show a view of the person 410, relative to the physical environment 305. The exemplary mobile or portable (e.g., moveable or attachable or handheld) device 105 can incorporate past views, models or augmented reality of the physical location of interest to the user 405. Processing utilized to construct the image can be based on the response of objects and materials to radio imaging as a function of radio frequency (e.g., objects and people have frequency dependent characteristics) as well as the time delays obtained by the measurements of the hand held device indicating the relative location of items, in addition to expert learning and artificial intelligence that facilitates the procedures to improve over time and with more user experience. The image that can be displayed on the hand held device can be a static picture, an image, a moving picture (e.g. video), and can be formulated based on previous photographs, images, models or maps that may have existed before the use of the device. Alternatively, the imaging device can create an image, and this image can be stored and used by the device, and sent to a remote storage facility for use in a database that can build images and can continue to learn about physical environmental modeling, for improved performance of the mobile or portable (e.g., moveable or attachable or handheld) device imaging for a population of users.

In certain exemplary embodiments of the present disclosure, mobile devices can directly communicate with one another via device-to-device (D2D) communications, instead of communicating with the BS, for determining mobile device position location. In example embodiments, mobile devices may conduct range and angular measurements on each D2D link. In example embodiments, the relative mobile device location information, extracted from the D2D link measurements, can be sent to a central localization unit co-located at one of the serving BS or a central server. The position of all the UEs in the network can simultaneously be determined by nonlinear least squares (LS) estimation, wherein the positions of the UEs that jointly minimize the deviation from the physical angular orientation and distance-based link constraints can be determined.

The exemplary system, method, and computer-accessible medium, according to an exemplary embodiment of the present disclosure, can include an exemplary mobile or portable (e.g., moveable or attachable or handheld) device, which can be used for portraying an image or providing cues relating to a physical environment that cannot be visualized by a human user. The exemplary device can utilize one or more antennas that, for example, can transmit and receive signals between about 10 GHz and about 3000 GHz. The one or more antennas can be electronically steered to form one or more beams that can facilitate transmission and reception of radio signals in proximity of the exemplary wireless device. The radio signals can have a RF bandwidth of between about 2 and about 90 GHz. The exemplary wireless device can render an image of a physical space that may not be seen by the naked eye of the user of the wireless device. The image can be compiled based on sensory data obtained by the exemplary mobile or portable (e.g., moveable or attachable or handheld) device using the one or more antennas and the radio signals. The exemplary wireless device can also be used for wireless communications.

Additional antenna elements in an array can provide a greater gain in the boresight direction and simultaneously a narrower main beamwidth lobe than an antenna with fewer active elements. Antenna arrays can use clusters of antenna elements in a hybrid fashion, or analog or digital beamforming can be done using many antenna elements. The wavelength at about 73 GHz can be approximately 4.1 mm which can correspond to a half-wavelength antenna separation of about 2.05 mm. If a BS antenna array can have 256 elements, where each antenna element can be a patch antenna with approximately 3 dBi of gain, it can cover an area of approximately 32.8 mm by 32.8 mm and results in a gain of 27 dBi (not considering feeder loss). Additionally, if a mobile antenna array can have 16 elements where each antenna element can be a patch antenna with 6 dBi of gain, it can cover an area of approximately 8.2 mm×8.2 mm.

Additional antenna elements can result in greater gain and tighter (e.g., narrower) beamwidths, and can impact the spatial resolution and signal levels that can be received upon radar returns. Higher frequencies can result in smaller wavelength and thus a greater number of elements and greater gain can be achieved in the same physical area. Averaging the signal signatures, over time, space, and frequency can yield better signal to noise ratio ("SNR") and deeper resolution for arriving signals.

The exemplary system, method, and computer-accessible medium, according to an exemplary embodiment of the present disclosure, can utilize wide bandwidth measurements and array processing with small variations in the radiated major beam angle to distinguish variations in the propagation channel over small angular separations which can map small distances between impinging objects in the channel. The exemplary system, method and computer-accessible medium can facilitate the measurement/detection of small differential time delays, using the wideband transmissions to distinguish time delays as a function of angle. By sensing the small differences in "returned echoes", which can yield propagation distances and their intensity, a map of the environment can be made. Additionally, e.g., machine learning procedures/systems can be used to determine a baseline set of known expected attenuations for a wide range of environmental partitions.

Thus, the exemplary system, method, and computer-accessible medium, can be used to build a map of the environment from the myriad of measurements, which can improve over time. The reflected and scattered energy can arrive from various directions, including those that can be behind or propagate through partitions. The exemplary system, method, and computer-accessible medium, according to an exemplary embodiment of the present disclosure, can learn the expected delays by understanding propagation responses. For example, a received signature that shows a delay at about 4 ns and then a weaker one at about 8 ns can be determined to be a wall that can be about 2 feet away (e.g., radio waves travel 1 foot per ns, thus a 4 ns return can mean that the signal transmitted 2 feet and then bounced back 2 feet, indicating a 2 foot distance to the first wall, and the much weaker return at 8 feet could be determined to be a second wall or object behind the first wall, since the 8 foot signal would have to travel 4 feet (e.g., passing the first wall and then hitting a second wall), and then reflected back 4 feet, for a total of an 8 ns delay. The amplitudes and angular values from many closely spaced signatures with slightly different angles can be used to confirm the assumptions of the "unseen" objects while building a map of the environment that can be overlaid or augmented with a known or visual image of the environment.

Using exemplary array processing, with controllable 2-D or 3-D antenna array beam steering, it can be possible to launch a transmitted signal, either narrowband, wideband, or sweeping/chirp signal, that can facilitate transmitted signal function to be launched in a particular direction. The response from the launched signal can contain the convolution of the launched signal with the response of the channel. By probing the channel with incremental changes in the spatial direction of the launched signal, the exemplary system, method and computer-accessible medium can identify variations in the response of the radio channel. Subtle differences in the received channel response, as a function of small change in launch angle, can be due to the variations in propagation, and can be based on the changes in the geometry of the impinging radio energy on various objects in the channel. As discussed above, the frequency-dependent nature and geometric dependencies on radio reflections, diffractions, and scatterings can be known or learned from successive transmissions at different directions, and matched or estimated based on a library of known responses to theoretical reflection, diffraction or scattering.

The exemplary system, method and computer-accessible medium can utilize machine learning to estimate the most likely or reasonable guesses as to what objects can cause the variations in radio responses for various perturbations in the launched radio signals. By using the received responses and comparing the variations across minute angles, and using geometric models that can be iterated for different distances from a transmitter, the received signal responses, such as received amplitude or power, phase, true time of flight, relative time delay between signals in a received signal response, the time delay of responses of the received signal, etc. can be used to determine the objects in a physical surroundings that can cause the measured variations in received signal responses as a function of angle and frequency, especially when considered with measured physical response such as time of flight, and particular signal level changes as a function of frequency and angle.

As an example, a smooth scatterer, such as a marble wall or glass, can have a relatively simple, angle dependent reflection response over a wide range of frequencies for a given polarization, and such a response can be known ahead of time, through computer memory (e.g., through look up tables as defined objects), or can be learned through calibration or pretest of the exemplary system. The particular signal can be detected by using a transmitter that transmits a signal at varying angles, and a co-located receiver can search for the reflected signal signature. At the particular transmitted and received angles, when the peak signal arrives from the smooth scatter, the beneficial signature can arrive and the smooth object can be identified. There can be, e.g., a few, dozens or hundreds of particular objects used with known frequency and polarization dependent signatures. More complex scattering and reflection can occur with rough surfaces, such as carpeting or plaster walls, or people, but the responses over a wide range of frequencies, polarizations, and incident/departure angles can be known, as a look up or pre-loaded, or can be learned or trained in the operation of the exemplary system.

The exemplary system, method, and computer-accessible medium, according to an exemplary embodiment of the present disclosure, can model Doppler effects for objects in motion, where Doppler can be a function of frequency as well as the angular orientation of the signal with the object's direction of motion. Thus, the exemplary system, method, and computer-accessible medium, can accurately estimate the location (e.g., the spatial position of a particular object with a known signature). Thus, the exemplary system, method, and computer-accessible medium, can be used to locate the position of a particular object of interest.

Exemplary Map-Assisted Millimeter Wave Localization for Accurate Position Location Positioning is the determination of the location of a wireless transmitter and/or receiver that is fixed or moving, based on the known locations of other reference points. In line-of-sight ("LOS") environments, the time of flight ("ToF") of a signal can be used to estimate the transmitter ("TX")—receiver ("RX") separation distance d (e.g., since d=c·t, where c is the speed of light and t is the ToF). The position of the wireless device can then be estimated by trilateration. In non-LOS ("NLOS") environments, ranging based on ToF alone introduces a positive bias in the position estimates since the path length of reflected multipath rays is longer than the true distance between the wireless transmitter and receiver The ultra-wide bandwidths available at mmWave and Terahertz ("THz") frequencies facilitate the RXs to resolve finely spaced multipath components and accurately measure the ToF of the signal. The phase accrued by a signal in LOS is proportionate to the ToF. The phase of the received signal in LOS can be used to estimate the TX-RX ("TR") separation distance in LOS at 300 GHz. The phase of a signal rotates a radians every λ meters, yet phase ambiguity arises, since signals that traverse distances that differ by integral multiples of λ incur the same phase. Prior work (J. S. Parker, P. Mickelson, J. Yeak, K. Kremeyer, and J. Rife, "Exploiting the Terahertz Band for Radionavigation," *Journal of Infrared, Millimeter, and Terahertz Waves*, vol. 37, no. 10, pp. 1021-1042, October 2016) tracked the phase of the transmitted signal at the RX and manually correcting for phase ambiguity, decimeter-level accuracy at 300 GHz can be achieved up to distances of 40 m in LOS.

A problem in determining of a mobile user's precise location from angular measurements can be similar to the 'three point problem' as known in land surveying, and can be used by electrically steerable phased array antennas in wireless systems at mmWave and THz frequencies.

Figure 5:
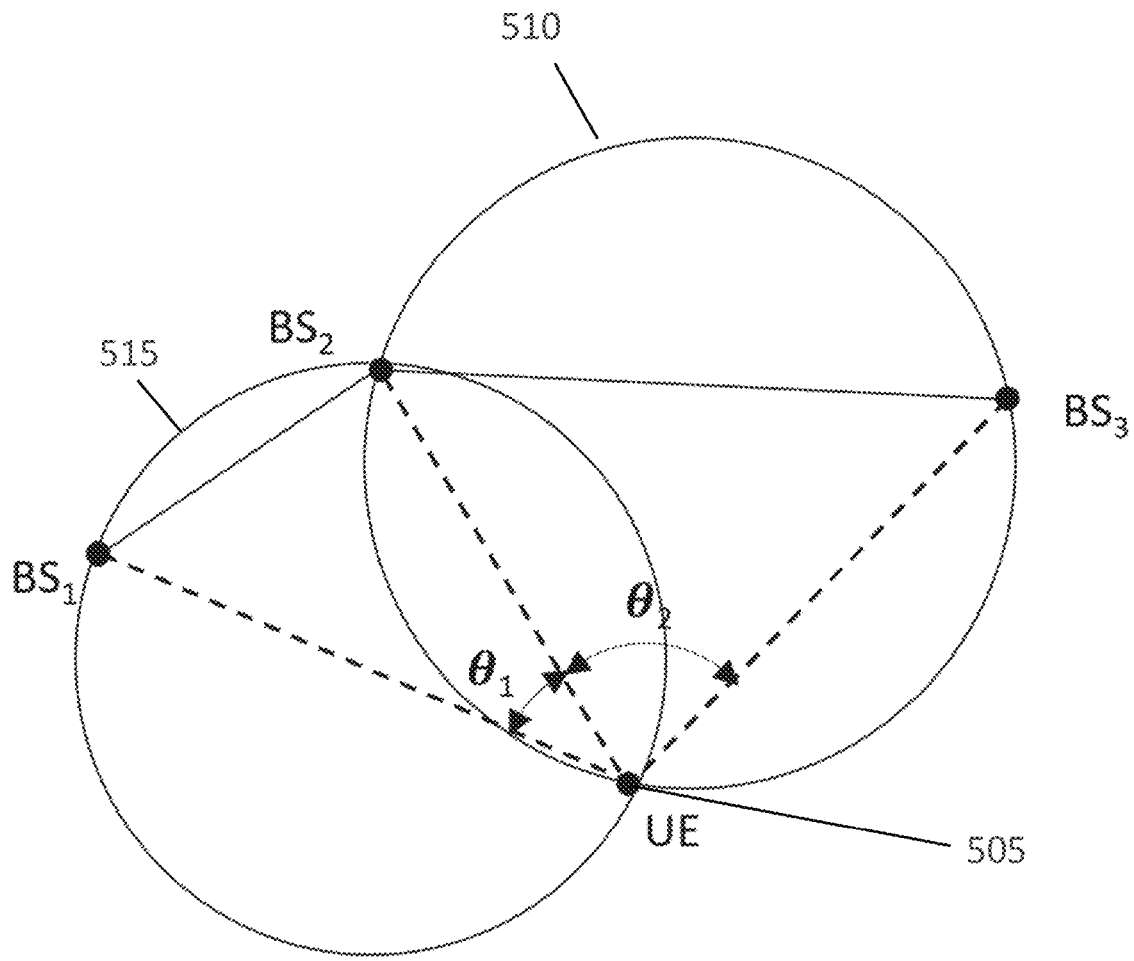
FIG. 5 is an exemplary diagram illustrating user-equipment ("UE") measures of the relative area of arrivals according to an exemplary embodiment of the present disclosure.

FIG. 5 shows an exemplary diagram illustrating the UE measures of the relative area of arrivals according to an exemplary embodiment of the present disclosure. As shown therein, relative angles $\theta_1$ and $\theta_2$ between BSs are measured by the user. The unknown position of the mobile user is then calculated (e.g., trigonometrically). Additionally, geometric observations can illustrate that that the locus of points where $BS_1$ and $BS_2$ subtend (e.g., point 505) a fixed angle $\theta_1$ is a circle circumscribing the triangle formed by the BSs (e.g., taken pairwise) and the user. The user location can correspond to the intersection of the two circles 510 and 515 corresponding to the two relative AoAs measured between two BS pairs. The solution to the three point problem can be sensitive to small errors in measured angles when either the BSs subtend a small angle at the user location, or when the observation point is on or near a circle which contains the three BSs. Look-up tables can also be used to localize the user, where the table stores the relative AoAs measured by the user at each location in the surveyed environment.

Narrow antenna beamwidths of antenna arrays at mmWave frequencies can facilitate the user device to accurately determine the AoA. In order to improve the AoA accuracy, two photodetectors can be placed at an offset and mechanically rotated. The sum and difference of the signals received by the two photodetectors can be calculated to determine the precise angle, even with a course beam pattern. When the sum of the signals received at the two detectors exceeds a threshold and the absolute value of the difference in the signals falls below the threshold, the beacon can be detected to be aligned with the photodetectors. An on-the-fly angular resolution of about 0.2° can be achieved, with wideband photodetectors, as was achieved in prior work (C. D. McGillem and T. S. Rappaport, "Infra-red location system for navigation of autonomous vehicles," in *Proceedings. 1988 IEEE International Conference on Robotics and Automation*, vol. 2, April 1988, pp. 1236-1238).

The exemplary sum-and-difference method can also be implemented by electrically steering an antenna array, using adjacent antenna beams or slightly offset antenna arrays with overlapping antenna patterns. A single antenna can also be used to locate the AoA of the peak signal from the BSs by quickly dithering the antenna boresight (e.g., electrically or mechanically). The sum and difference of the received signals at successive time instants can be used in place of measurements from two (or more) offset antennas.

In NLOS environments, due to specular reflections from walls and metallic surfaces, rays do not arrive from the direction of the BS, leading to accuracy penalties, if used the AoA is used directly. Real-time electric beam steering procedures can facilitate scanning of room features in a matter of seconds. As a result, mobile phones may be able to generate detailed 3-D maps on the fly, or download them from the cloud. For example, cloud servers, edge servers, other base station, access points or another user on the network can be used to generate the map. Additionally, the map generation can be crowd sourced using multiple devices. NLOS objects (e.g., around corners) can be "viewed" by first rapidly scanning the environment via beam steering, in order to determine all the reflecting obstructions in the surroundings. The reflecting obstructions can then be distinguished from the target NLOS object to be "viewed" by taking advantage of the fine temporal resolution at mmWave and sub-THz frequencies to create a 3-D map of the local environment. The 3-D maps can be utilized (e.g., in conjugation with angle of departure ("AoD") from the known BSs and ToF measurements) to calculate, back-solve or estimate the actual paths that the multipath components take to reach the user. The exemplary paths taken by the multipath components that reach the user contain sufficient information to localize a user in NLOS, even in the absence of LOS multipath signals.

Exemplary 3-D mmWave Ray Tracer

Since wideband directional measurements can be expensive and time consuming, a ray-tracer that can be truthful to actual measurements at a wide range of locations can be a powerful tool for determining position location procedures, data fusion, and overall position location accuracy and sensitivity.

NYURay, a 3-D mmWave ray tracer has been developed (O. Kanhere, S. Ju, Y. Xing, and T. S. Rappaport, "Map Assisted Millimeter Wave Localization for Accurate Position Location," in *IEEE Global Communications Conference*, December 2019, pp. 1-6). NYURay is a hybrid ray tracer which combines shooting-bouncing rays ("SBR"), with geometry-based ray tracing.

A SBR ray tracer can launch rays uniformly in all directions and then trace the path of each launched ray, as the ray interacts with various obstructions in the environment. Each launched ray can represent a continuous wavefront. Each ray can carry the power that can be carried by the wavefront.

The accuracy of the AoA of rays received at the RX can depend on the number of rays launched from the TX. For example, rays are launched from the vertices of a tessellated icosahedron with tessellation factor N, since the average radial separation between two rays can be $$\frac{69°}{N},$$

for sub-degree accuracy for AoA, N>50, which can be computationally expensive.

Figure 6:
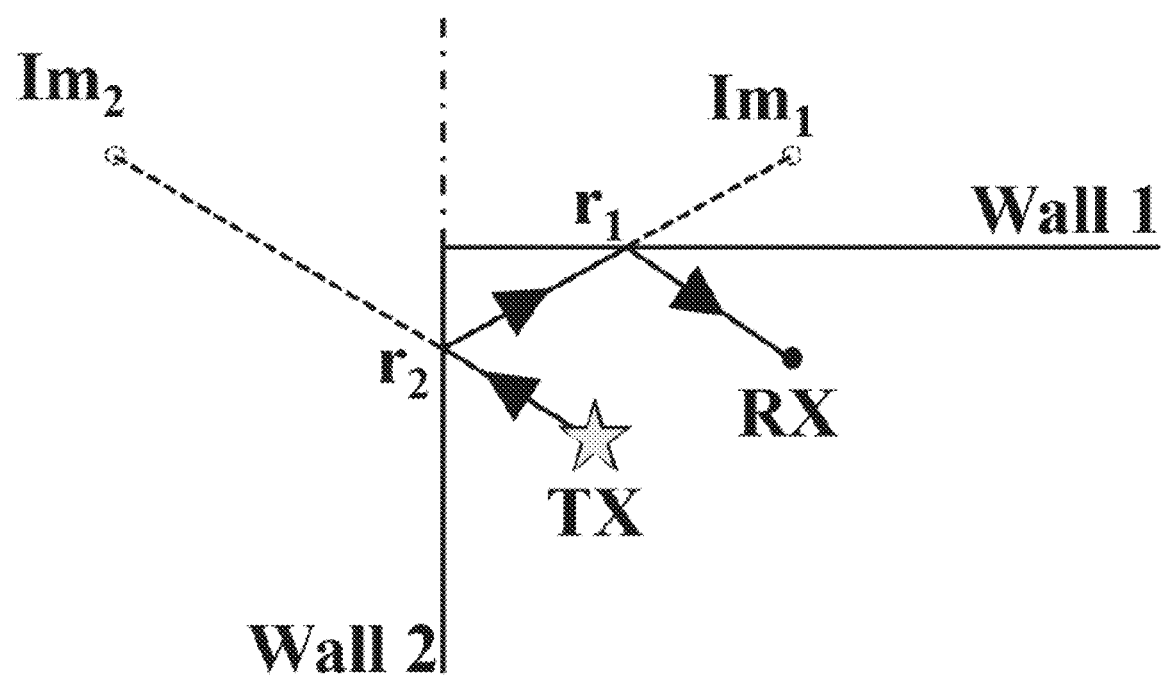
FIG. 6 is an exemplary diagram illustrating exemplary ray tracing based on exemplary images according to an exemplary embodiment of the present disclosure.

Image-based ray tracing can be based on the principle that the incident ray and the reflected ray can make the same angle with the normal to the plane containing the obstruction which can be computationally much easier. Obstructions can be treated as infinitely long, thin, mirrors when using image-based ray tracing. FIG. 6 shows an exemplary diagram illustrating ray tracing based on exemplary images according to an exemplary embodiment of the present disclosure. For example, as shown therein, $Im_1$ is the image of RX in wall 1 and $Im_2$ is the images of $Im_1$ in wall 2. The image of the RX can be taken, successively, in at most k obstructions, where k can be the maximum number of reflections a ray can go through.

If there is a large number of obstructions, the simulation run-time can be large. Assuming that each ray can be reflected at most three times, with N obstructions in the environment, there can be $$\binom{N}{3}$$

images that need to be computed $\mathcal{O}$. Although the image-based ray tracing procedure can find the direction of arrival of rays accurately, finding the reflection of the RX, recursively, from all combinations of obstructions can be computationally expensive.

To reduce the computational overhead, NYURay uses a hybrid ray tracing procedure. The approximate trajectories of rays that reach the RX can first be determined via SBR ray tracing. Once all the reflecting surfaces in the path of a ray can be determined, image-based ray tracing can be used to calculate the recursive reflections of the RX. The ray trajectory can be accurately calculated by connecting all the RX images.

In every direction where a ray was launched, on encountering an intersection with an obstruction, two new rays can be created—the specular reflected ray and the transmitted ray. By Snell's Law, the reflected ray and the incident ray can form equal angles with the normal to the obstruction. The transmitted ray can be assumed to propagate in the same direction as the incident ray. A linear model can be used to characterize the variation of reflection coefficient $\Gamma$ with incident angle $\theta_i$, based on reflection measurements. for example:

$$|\Gamma| = \frac{E_r}{E_i} = 0.56 \cdot \theta_i + 0.096, \quad (1)$$

where $E_r$ can be the reflected electric field, $E_i$ can be the incident electric field, and $\theta_i$ can be the angle of incidence of the ray. As a result, the reflected power $P_r=|\Gamma|^2 P_i$, where $P_i$ can be the power incident on the obstruction. A constant transmission loss of 7.2 dB can be assumed, based on the propagation measurements.

New source rays at each boundary can then be recursively traced in the reflection and transmission directions to the next encountered obstruction on the propagating ray path. Path loss can be calculated based on the free space path loss ("FSPL") model, with a TR separation distance equal to the total propagated ray length. Additionally, at most three reflections of rays can be considered in order to reduce computation time. The limitation on the number of reflections can further be justified by the observation that mmWave signals typically do not experience more than two reflections.

Figure 8:
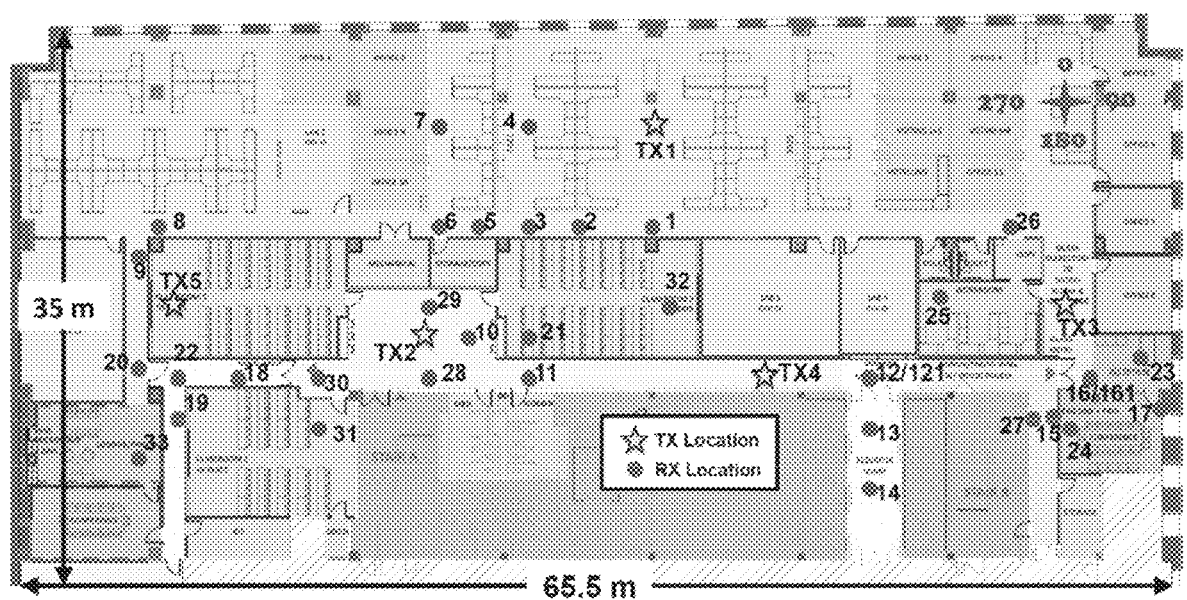
FIG. 8 is an exemplary floor plan map showing a floor for testing the exemplary system, method and computer-accessible medium according to an exemplary embodiment of the present disclosure.

In prior work (G. R. MacCartney, Jr. et al., "Indoor office wideband millimeter-wave propagation measurements and models at 28 GHz and 73 GHz for ultra-dense 5G wireless networks," IEEE Access, vol. 3, pp. 2388-2424, October 2015), propagation measurements were conducted at 28 GHz and 73 GHz at the NYU WIRELESS research center, located on the 9th floor of 2 MTC using a 400 Megachipper-second ("Mcps") wideband sliding correlator channel sounder with high gain steerable antennas. The directional antennas used in the propagation measurements had antenna beamwidths of about 30° and about 15°, at 28 GHz and 73 GHz respectively. FIG. 8 shows most or all the TX and RX locations where the propagation measurements were conducted.

Figure 7:
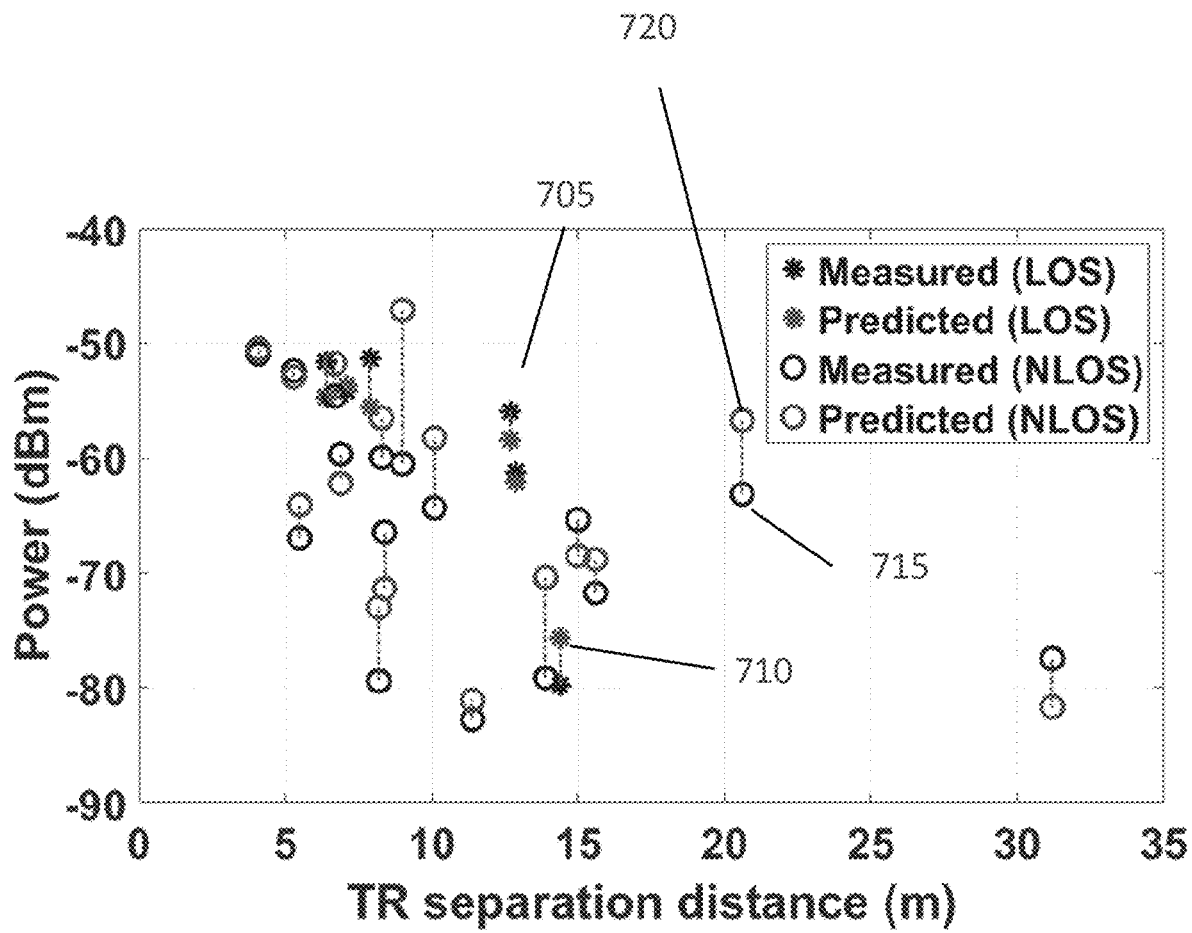
FIG. 7 is an exemplary graph illustrating a comparison between measured and predicted powers of 22 transmit ("TX")-receive ("RX") links according to an exemplary embodiment of the present disclosure.

In (O. Kanhere, S. Ju, Y. Xing, and T. S. Rappaport, "Map Assisted Millimeter Wave Localization for Accurate Position Location," in *IEEE Global Communications Conference*, December 2019, pp. 1-6), the performance of NYURay was evaluated by comparing the variation in the predicted and measured path loss with TR separation distance, as is illustrated in FIG. 7. For example, FIG. 7 shows an exemplary graph illustrating the comparison between the measured and predicted powers of 22 TX-RX links (e.g., measures LOS 705, predicted LOS 710, measures NLOS 715 and predicted NLOS 720) according to an exemplary embodiment of the present disclosure. The 22 TX-RX links that were chosen for the comparison were widely spread. The received power was predicted to within 6.5 dB, except for one outlier (e.g., link TX 4 RX 16) which had a prediction error of 13.4 dB.

Exemplary Environmental Imaging

Radar at mmWave and THz frequencies can be more effective than light or infrared-based imaging such as Light Detection and Ranging ("LIDAR"), due to the smaller impact that weather and ambient light can have on the THz channel. While LIDAR can provide higher resolution, LIDAR cannot work when it is foggy, raining, or cloudy. mmWave and THz radar can be used for assisting driving or flying in foul weather, as well as in military and national security. High-definition video resolution radars that operate at several hundred gigahertz can be sufficient to provide a TV-like picture quality and can complement radars at lower frequencies (below 12.5 GHz) that provide longer range detection but with poor resolution. Dual-frequency radar systems can facilitate driving or flying in very heavy fog or rain. mmWave and THz waves can augment human and computer vision to see around corners and to "view" NLOS objects, which can facilitate capabilities in rescue and surveillance, autonomous navigation, and localization.

In prior work (M. Aladsani, A. Alkhateeb, and G. C. Trichopoulos, "Leveraging mmWave Imaging and Communications for Simultaneous Localization and Mapping," in *International Conference on Acoustics, Speech, and Signal*

Processing (*ICASSP*), May 2019, pp. 1-4), a 3-D image of the environment was obtained via holographic 3-D imaging. A plane uniform linear array of antennas at the TX was used to calculate the signal scattered from objects in the environment, R(x, y, f), measured at point (x, y, z) using a vector network analyzer ("VNA") at frequency f, varying from about 220 to about 300 GHz. The image of the environment f(x, y, z) was obtained as:

$$f(x,y,z) = IFT_{3\text{-}D}\{FT_{2D}\{R(x,y,f)\}\}, \quad (2)$$

where IFT and FT can be the discrete spatial inverse Fourier transform and Fourier transform respectively.

A 3-D map of the environment may alternatively be generated for example, from point cloud that may be obtained from laser scanners. Another example technique for 3-D map generation is to utilize the floorplan of the building to identify the location of walls, doors, windows and other major architectural elements on the floor, and to extrude the architectural elements to their known heights.

Exemplary Precise Position Location mmWave imaging and communications can be incorporated in portable devices operating above, for example, 100 GHz. By building or downloading the map of the environment, an exemplary mobile device can be used to predict the signal level, using real time site-specific prediction, or uploading of the map to the cloud that compiles physical maps, or which uses such maps for mobile applications. Based on the large bandwidth available at frequencies above 100 GHz, the LOS and NLOS, the exemplary system, method and computer-accessible medium can localize users with centimeter accuracy.

Additionally, the exemplary system, method and computer-accessible medium can utilize mmWave or THz imaging to reconstruct 3D maps of the surroundings in unknown environments, thus merging sensing, and imaging and position location all at the same time. mmWave and THz signals can reflect strongly from most building materials which can facilitate the imaging of hidden objects (e.g., NLOS imaging). Additionally, scattering can also be well modeled and predicted. Based on the 3D maps of the physical surroundings, and the time and angular information from a mobile TOA and AOA, centimeter level localization and mapping can be achieved with the massive bandwidth and large antenna arrays at mmWave and THz frequencies.

In a multipath rich environment, source rays can arrive at the RX via a direct path (e.g., if the direct path exists) as well as paths along which the source rays can suffer multiple reflections. With knowledge of the angles at which the source rays arrive at the RX, the ToF of the source rays and a 3-D map of the surrounding environment, the RX can determine the location of the source.

In prior work (A. O. Kaya, L. Greenstein, D. Chizhik, R. Valenzuela, and N. Moayeri, "Emitter Localization and Visualization (ELVIS): A Backward Ray Tracing Algorithm for Locating Emitters," in 2007 *41st Annual Conference on Information Sciences and Systems*, March 2007, pp. 376-381), the rays along each AoA were backpropagated, as though the RX were emitting the rays. Along the backpropagating path, the ray can interact with obstructions in a manner identical to how a forward-propagating ray can interact. The intersection of two or more back-traced rays were labeled as candidate TX locations. The TX can be localized to the weighted sum of all candidate TX locations. The candidates that had several other intersections in their vicinity can be given greater weight. Using six RX locations, assuming perfect AoA resolution, a 90 percentile localization error of 5 m was achieved in (A. O. Kaya, L. Greenstein, D. Chizhik, R. Valenzuela, and N. Moayeri, "Emitter Localization and Visualization (ELVIS): A Backward Ray Tracing Algorithm for Locating Emitters," in 2007 *41st Annual Conference on Information Sciences and Systems*, March 2007, pp. 376-381). The thermal noise floor was about −85 dBm and an about 30 dBm, 300 MHz signal was transmitted by the TX.

Exemplary Localization with One or More BSs

Map-assisted positioning with angle and time ("MAP-AT") can be or include a map-assisted localization procedure. Localization can be possible using a single BS, when at least two multipath components arrive at the user. The user does not need to be in LOS with the BS. MAP-AT can facilitate two types of BS-user configurations: the user can either be the TX or the RX of a known radio signal. If the user can be the TX, ToF and AoA information can be utilized. If the user can be the RX, ToF and AoD information can be utilized. Temporal and angular measurements can impose constraints on the possible locations of a user. A 3-D map of the indoor environment can create additional constraints on the user's location. These exemplary constraints are explained below.

Exemplary Configuration I—User in Reception Mode

In configuration-I, the user receives a known signal from the BS. The BS can calculate the AoD of each multipath signal that reaches the user during initial access. The ToF of each multipath component from the BS arriving at the user can either be estimated via the round trip time of the multipath component or the one-way propagation time. The BS can then send the AoD and ToF of each multipath component to the user via a feedback channel.

Figure 9:
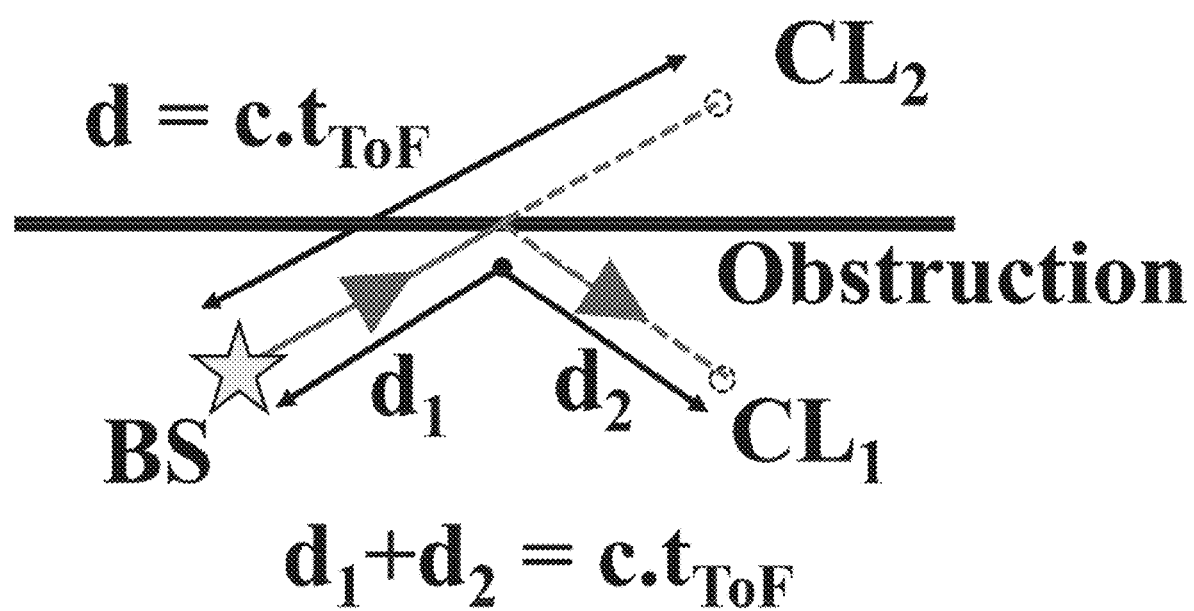
FIG. 9 is an exemplary diagram illustrating two exemplary candidate locations of a user according to an exemplary embodiment of the present disclosure.

For example, consider the case when there can be at most one reflection or transmission of the signal before it reaches the BS. If the ToF and AoD of a multipath signal that reaches the BS can be known, there can be two possible locations of the user. FIG. 9 shows an exemplary diagram illustrating two candidate locations of a user according to an exemplary embodiment of the present disclosure. The two candidate locations of a user, $CL_1$ and $CL_2$, can correspond to the cases where the signal sent from the BS is reflected by and passes through the obstruction, respectively. Additionally, as shown in FIG. 9, if the ray reached the user after one reflection, the user and BS must lie on the same side of the reflecting object. If the ray reached the BS directly from the user, or through one obstruction, the BS and user must lie on opposite sides of the obstruction. The possible locations of the user, based on ToF and AoD at the BS can be referred to as candidate locations.

The exemplary procedure for locating candidate locations can be repeated for all multipath components. If a single multipath component can be received by the user, the BS may not be able to determine which candidate location corresponds to the user's true location. However, when two or more multipath components arrive at the user, a majority of the candidate locations can correspond to the true location of the user. For each multipath component arriving at the user, one candidate location calculated based on the AoD and ToF of the multipath component can correspond to the true user's location.

Figure 10:
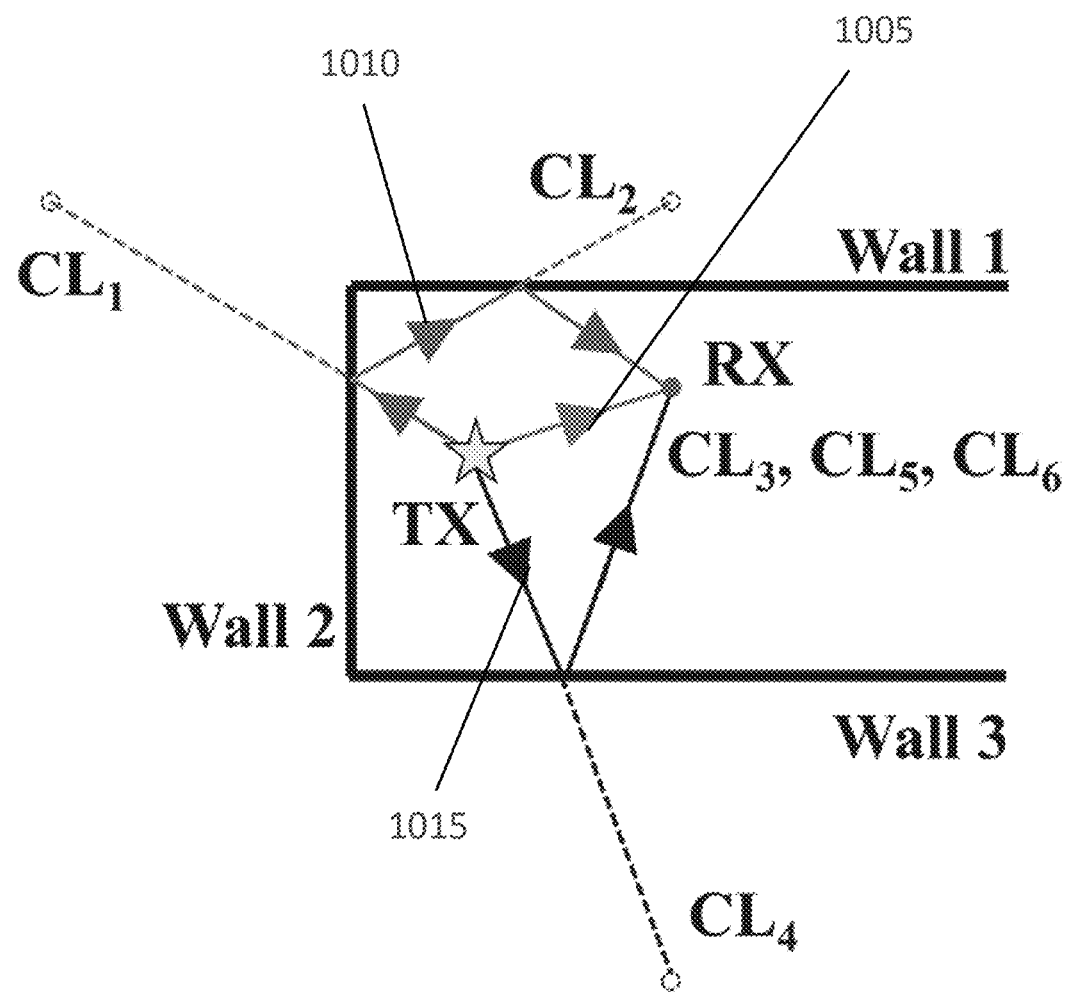
FIG. 10 is an exemplary diagram illustrating three exemplary multipath components that arrive at the user according to an exemplary embodiment of the present disclosure.

FIG. 10 is an exemplary diagram illustrating three multipath components that arrive at the user according to an exemplary embodiment of the present disclosure, which includes all the candidate locations when three multipath components can be received by the user ("RX") from the BS ("TX"). The user's location can correspond to the candidate location identified by the maximum number of multipath components. In particular, as shown in FIG. 10, three multipath components arrive at the user RX; one LOS component 1005 and two NLOS components 1010 and 1015. Of the six candidate locations for the user, based on AoD and ToF measurements at the BS (e.g., $CL_1$-$CL_6$), three candidate locations (e.g., $CL_3$, $CL_5$, $CL_6$) correspond to the actual location of the user. The position of the user is estimated to be the modal candidate location (e.g., $CL_3$, $CL_5$, $CL_6$).

Errors in ToF measurements can cause the BS to incorrectly estimate the path length to the user. Due to inaccurate AoD measurements, the BS may incorrectly estimate the user's bearing. As a result, a candidate locations estimated by MAP-AT using imprecise ToF and AoD information may not coincide with the user's true location. However, it can be likely that the candidate locations can be close to the user's true location, and thus close to one-another. MAP-AT can be modified to first group the candidate locations that can be close to one another (e.g., at a distance of up to d=40 cm, where d can be a tunable parameter) to form candidate location clusters. The user position can be estimated to be the centroid of the candidate location group with maximal members.

MAP-AT can be generalized to use multiple BSs. Exemplary candidate locations can be determined, corresponding to all the multipath components received by the user from all BSs. MAP-AT can then proceeds in a similar fashion to the case when only one BS was utilized, by finding the candidate location identified by the maximum number of multipath components.

Exemplary Configuration-II—User in the Transmission Mode

In configuration-II, the user transmits a known signal to the BS. The BS can calculate the AoA of each multipath signal that reach the BS. The ToF of the each multipath component from the user arriving at the BS can either be estimated via the round trip time of the multipath component or the one-way propagation time. If the ToF can be estimated via round-trip time, the BS does not need to send the ToF of the multipath components to the user via a feedback channel. Additionally, an exemplary synchronization between the user and the BS may not be needed. The BS may only need to send the AoA of each multipath component to the user.

Candidate locations of the RX can be found analogously to configuration-I above. The user's location can correspond to the candidate location identified by the maximum number of multipath components.

Exemplary Simulations and Results

Simulations of localization using MAP-AT were conducted at 73 GHz by synthesizing ToF and AoD measurements at 30 TR combinations via NYURay, of which 20 were in NLOS and 10 were in LOS. The BS and user locations chosen taken from the previous indoor propagation measurement campaign conducted at the NYU WIRELESS research center on the 9th floor of 2 MetroTech Center in downtown Brooklyn, N.Y. (G. R. MacCartney, Jr. et al., "Indoor office wideband millimeter-wave propagation measurements and models at 28 GHz and 73 GHz for ultra-dense 5G wireless networks (Invited Paper)," *IEEE Access*, vol. 3, pp. 2388-2424, October 2015.)

The research center is a typical large office, with cubicles, walls made of drywalls and windows. FIG. 8 shows an exemplary map illustrating a floor for testing the exemplary system, method and computer-accessible medium according to an exemplary embodiment of the present disclosure. Since localization accuracy may not depend on the user configuration (e.g., in configuration I or II), without loss of generality, configuration-I was chosen to analyze the performance of the exemplary positioning procedure.

The position of each user was determined using a single BS. To make the simulations realistic, zero mean Gaussian noise with standard deviation $\sigma_{AoD}$=0.5° was added to the AoD measurements. Three difference levels of Gaussian noise were added to ToF measurements. The standard deviation $\sigma_{ToF}$ was set to about 0.25 ns, about 0.5 ns and about 1 ns. The positioning error for each user was defined to be equal to the 3-D Euclidean distance between the position estimate and the true position of the user. The rms positioning error for each user was calculated over 100 simulations at all three ToF measurement noise levels.

TABLE I

Performance of the map-assisted localization procedure for different TR separation distances in LOS and NLOS environments.

| TX-RX distance | Env. | Number of Users | Mean Localization error (cm) |
|---|---|---|---|
| <10 m | LOS | 9 | 4.1 |
| | NLOS | 16 | 18.8 |
| 10-20 m | LOS | 1 | 9.4 |
| | NLOS | 4 | 16.6 |
| (all) | LOS | 10 | 4.6 |
| | NLOS | 20 | 18.3 |

TABLE II

Performance of the map-assisted localization procedure with more than one BS.

| BS-User Link Type | Number of Users | Mean Localization Error (cm) |
|---|---|---|
| 1 LOS, 1 NLOS | 9 | 4.6 |
| 2 NLOS | 17 | 9.6 |
| 1 LOS, 2 NLOS | 6 | 4.8 |
| 3 NLOS | 6 | 5.6 |

Exemplary Localization Performance with One BS

With noise levels of $\sigma_{AoD}$=0.5° and $\sigma_{ToF}$=0.25 ns, the mean rms positioning error was about 4.6 cm in LOS conditions and about 18.3 cm in NLOS conditions, over a total of 30 user locations. Table I above illustrates how the localization error varies with TR separation distance in LOS and NLOS environments. Increasing $\sigma_{ToF}$ to 1 ns degraded the performance of the procedure. Despite the two outliers with rms localization errors of about 1.9 m and about 3.5 m, the median localization accuracy was about 17.5 cm, with a mean localization error of about 38.7 cm.

Exemplary Localization Performance with Multiple BSs

Of the 30 user locations previously considered, 26 locations were within the range of at least two BS. 12 user locations were within the range of three BSs. The performance of the map-assisted localization procedure with more than one BS is summarized in Table II above. For the users not in LOS of any BS, increasing the number of BSs used for localization can facilitate a reduction in the localization error. When one BS can be used to localize a NLOS user, an average localization error of about 19.2 cm can be achieved. With two and three BSs, the localization error dropped to about 9.6 cm and about 5.6 cm respectively. The localization error for users in LOS remains constant (e.g., <5 cm).

Figure 11:
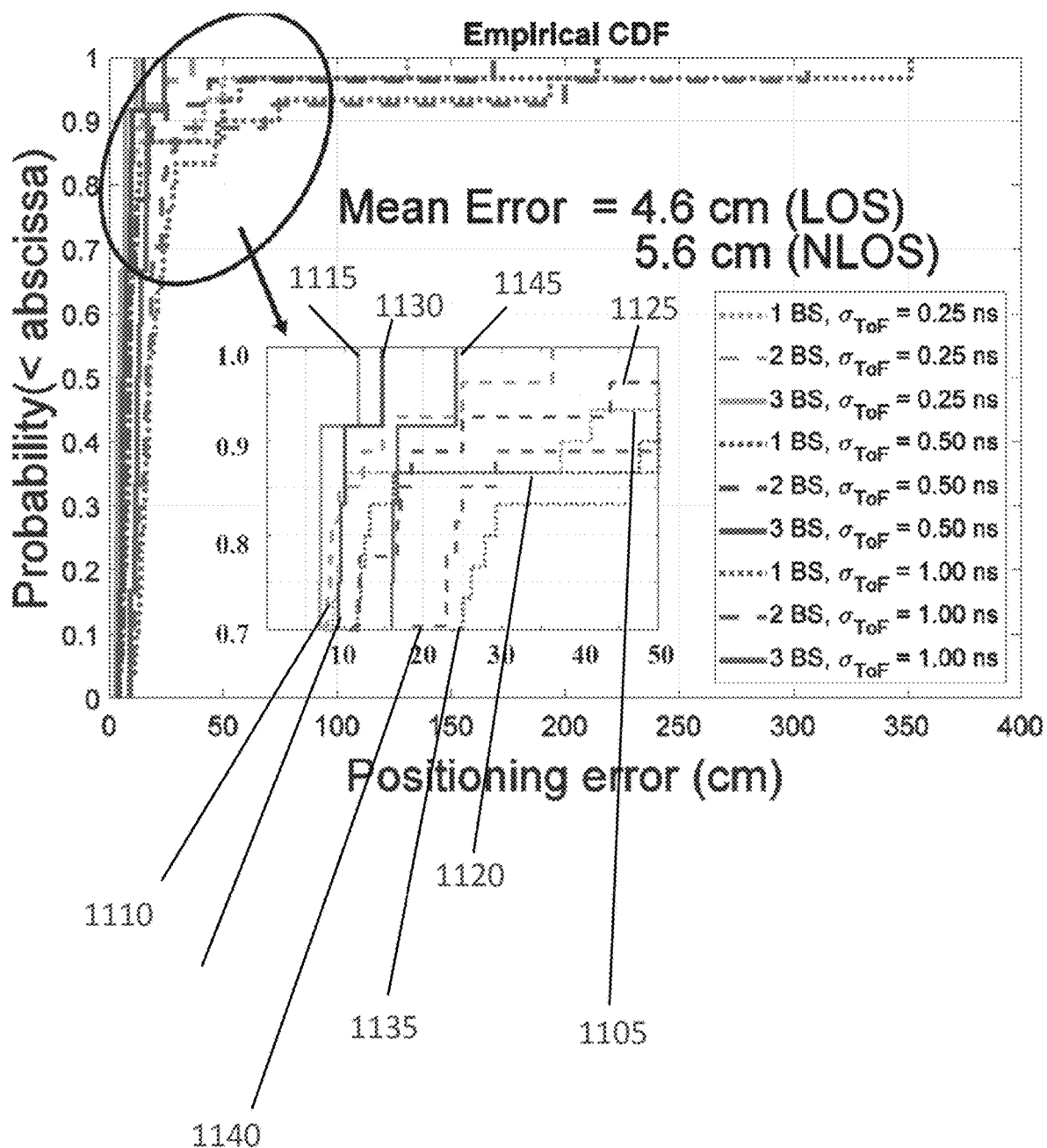
FIG. 11 is an exemplary graph illustrating exemplary cumulative density functions of the positioning error according to an exemplary embodiment of the present disclosure.

The cumulative density functions ("CDFs") of the positioning errors, with one, two, and three BSs are shown in FIG. 11. In particular, FIG. 11 shows an exemplary graph illustrating the cumulative density functions of the positioning error when a user is localized using one BS (e.g., elements 1105, 1120 and 1135), two BSs (e.g., element 1110, 1125 and 1140) and three BSs (e.g., elements 1115, 1130 and 1145), with $\sigma_{AoD}=0.5°$ according to an exemplary embodiment of the present disclosure. For example, When a single BS can be used, the rms errors were about 3.5 m and about 1.9 m for two outlier user locations. However, when three BSs were utilized, all users were localized to within about 25 cm.

The exemplary system, method and computer-accessible medium, according to an exemplary embodiment of the present disclosure, can include MAP-AT for map-assisted data fusion of AoD and ToF information, to provide centimeter-level localization. A 3-D map of the environment (generated on-the-fly by the user or downloaded a-priori), in concert with AoD and ToF information can be used to predict the propagation path of multipath components received by the user. MAP-AT was tested using NYURay, a 3-D ray tracer developed herein. The ray tracer was calibrated based on real-world measurements conducted at 28 and 73 GHz, and predicted the received power accurately to within 6.5 dB. Based on simulations conducted at 30 RX locations corresponding to the real world measurement locations, a mean localization accuracy of 4.6 cm in LOS and 18.8 cm in NLOS was achieved in a typical large office environment using a single BS per user, with TR separation distances varying from 3 m to 14.5 m. By using three BSs, the localization error for LOS users remained the same while the localization error for NLOS users dropped to 5.6 cm.

Exemplary Position location in 3GPP

Exemplary support for UE position location in the 3GPP standard can be traced back to the E-911 location service regulations set forth by the FCC in 1996 (See T. S. Rappaport, J. H. Reed, and B. D. Woerner, "Position location using wireless communications on highways of the future," IEEE Communications Magazine, vol. 34, no. 10, pp. 33-41, October 1996) (See J. H. Reed, K. J. Krizman, B. D. Woerner, and T. S. Rappaport, "An overview of the challenges and progress in meeting the E-911 requirement for location service," IEEE Commun. Mag., vol. 36, no. 4, pp. 30-37, 1998). Today, with the ubiquitous nature of cell phones, 80% E-911 calls are placed from wireless devices and hence wireless position location is even more important. Widespread adoption of a position location algorithm by network operators and cell phone manufacturers can be made possible if the algorithm is standard-compliant. To develop standard-compliant position location algorithms, one may need to understand 3GPP position location, the wireless channel parameters currently used for 3GPP position location, as well as potential channel features that may be introduced in future 3GPP releases.

Exemplary Position Location Techniques Supported by 3GPP

Figure 14:
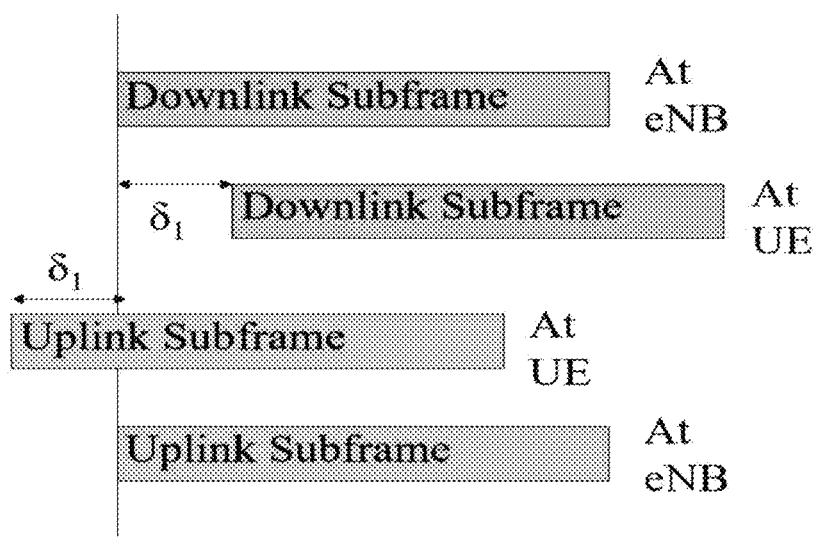
FIG. 14 is an exemplary TA ($\delta_1$) that may ensure uplink frames of all UEs are aligned according to an exemplary embodiment of the present disclosure.

An exemplary 3GPP position location technique, Cell ID (CID) proximity positioning, can estimate the UE to be at the serving BS. With Enhanced CID (E-CID), CID accuracy can be improved by incorporating reference signal strength (RSS) measurements at the UE, and timing advance (TA) and AoA measurements at the BS. Due to the varying distances of UEs from the BS, the uplink data can arrive at the BS with a delay proportionate to the BS-UE distance. To ensure uplink frame time-alignment, the TA can be sent as downlink feedback and can facilitate UEs to adjust their uplink transmission, and thus, can provide an estimate of the round trip time (RTT) of the first arriving MPC at the BS, as shown in, e.g., FIG. 14. FIG. 14 shows an exemplary TA ($\delta_1$) that can ensure uplink frames of all UEs are aligned. The time of flight (ToF) of the first arriving MPC (the one-way travel time) can be equal to half the RTT. The minimum reportable one-way distance $d_{min}$, calculated from the ToF, can decrease with an increase in subcarrier spacing (SCS) and can be given by $$d_{min}b=78.12/2^\mu, \quad (1)$$

when the SCS is $2^\mu \times 15$ kHz. In 5G-NR, the maximum SCS is 60 kHz for lower frequency bands (below 6 GHz), corresponding to a minimum reportable distance of 19.52 m, while the maximum SCS is 480 kHz for higher frequency bands (above 24 GHz), corresponding to a minimum reportable distance of 2.44 m.

Although specific details of how to utilize the RSS and TA measurements are not provided in the standard, TA and/or RSS can be utilized to estimate the distance between the BS and UE. The distance estimate can be combined with AoA to calculate the position of the UE via simple geometric calculations.

While antenna arrays at BS are becoming more prevalent due to the need for beamforming at mmWave frequencies, some current BSs may not be fitted with antenna arrays due to cost considerations. In the absence of AoA, multiple distance estimates (estimated from RSS/TA) can also be used for UE position location (via trilateration) if the UE is in the coverage area of at least three BSs. The primary BS may initiate forced handovers, allowing the UE to estimate the TA/RSS from other neighboring BSs.

GNSS receivers (RXs), present in nearly many modern cellular devices, can localize a UE to within 5 m when four or more satellites are directly visible However, in urban canyons where the direct path to satellites is blocked, GNSS performance may deteriorate. With assisted GNSS (A-GNSS), 3GPP networks can improve GNSS performance by providing assistance information to the UE that can improve RX sensitivity, and reduce time to first fix (TTFF) and UE power consumption. The cellular network can provide external information that improves the GNNS position TTFF by utilizing a coarse estimate of the UE location (for instance via E-CID) to reduce the frequency/code-delay search space. The lower TTFF allows UEs to consume less power as the GNSS RX need not be always-on.

Downlink TDoA (e.g., called observed time difference of arrival (O-TDOA) in 3GPP can be measured at UE. The difference in time at which the PRS is received at the UE from two BSs is called the reference signal timing difference (RSTD). Since the BSs can be synchronized via GNSS satellites, RSTD may have a direct relation to the geometric difference in distance of the two BSs from the UE. O-TDoA supports a time resolution of 0.5 $T_s$ (4.88 m), when RSTD≤4096 $T_s$ and a time resolution of 1 $T_s$ (9.67 m) when 4096 $T_s$≤RSTD≤15391 $T_s$, where 1 $T_s$=32.522 ns (9.76 m).

Just as O-TDoA is measured at the UE, uplink time difference of arrival (UTDOA) can be measured at the BS, allowing UEs lacking capabilities to make OTDoA measurements to be localized. The SRS, a Zadoff-Chu sequence transmitted by the UE, is utilized by two or more pairs of BS to measure the relative time of arrival. A minimum resolution of 2 $T_s$ (19.51 m) is possible.

To improve the vertical component of UE position location, the barometric positioning method can be used, whereas the atmospheric pressure at the UE can be measured using barometric pressure sensors found in, e.g., most modern cell phones. Since the atmospheric pressure decreases with an increase in UE height, by calibrating the barometric pressure sensor to the atmospheric pressure at a known height, the vertical UE position can be determined.

With the advent of ultra-wide bandwidths due to the utilization of mmWave frequency bands, MPCs can now be resolved to a finer time resolution. Localization techniques that exploit multipath information may require delay and angle measurements of more than one path. Currently, 3GPP supports the reporting of the relative delay of all MPCs with respect to the MPC utilized to calculate the RSTD, via the additional path information element with a resolution of 0.5 $T_s$ (4.88 m). By adding the relative MPC delay to TA, the absolute time of arrival of individual MPCs can be calculated. 3GPP currently supports the measurement of the AoA of only one signal at the BS, due to which AoA information of individual MPCs is lacking.

Figure 12A:
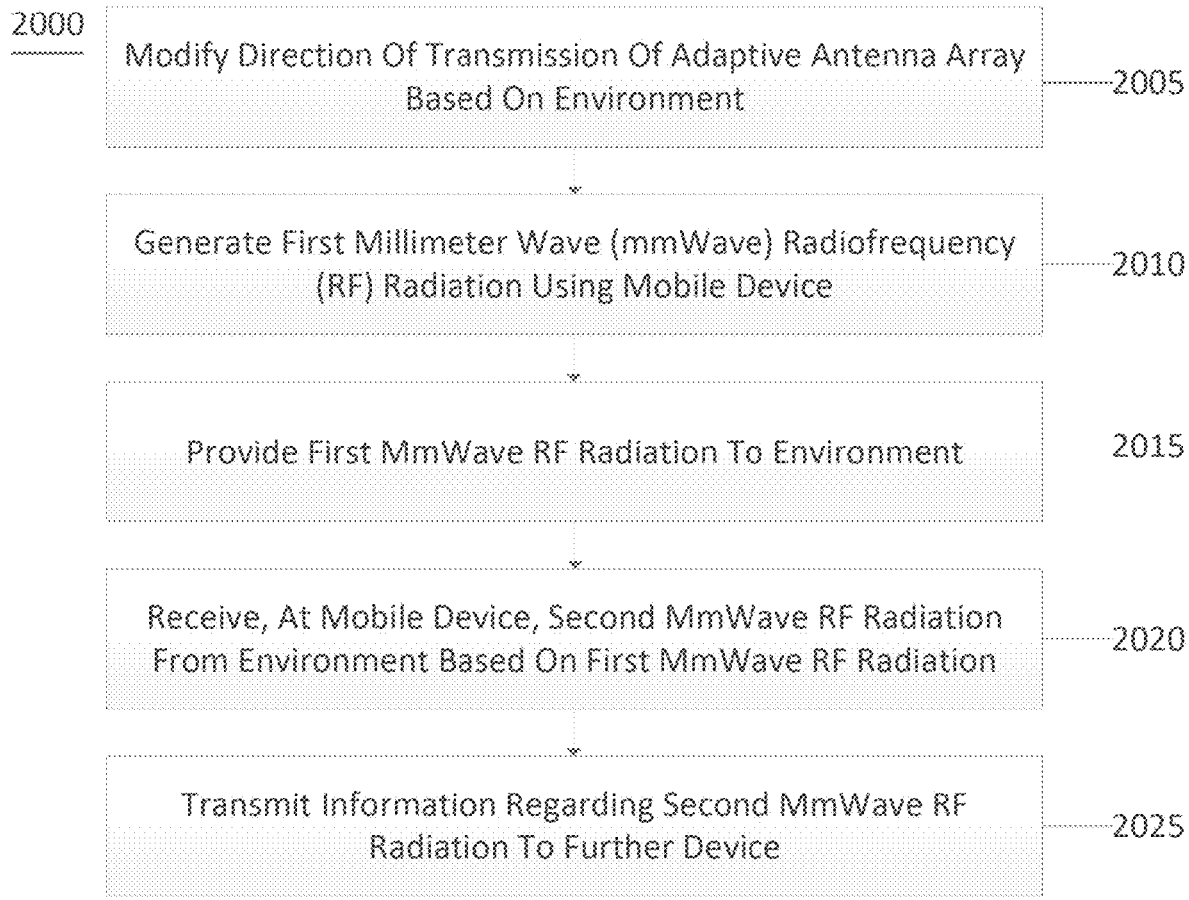
FIGS. 12A and 12B are an exemplary flow diagram of a method for generating an image and/or a video of an environment according to an exemplary embodiment of the present disclosure.
Figure 12B:
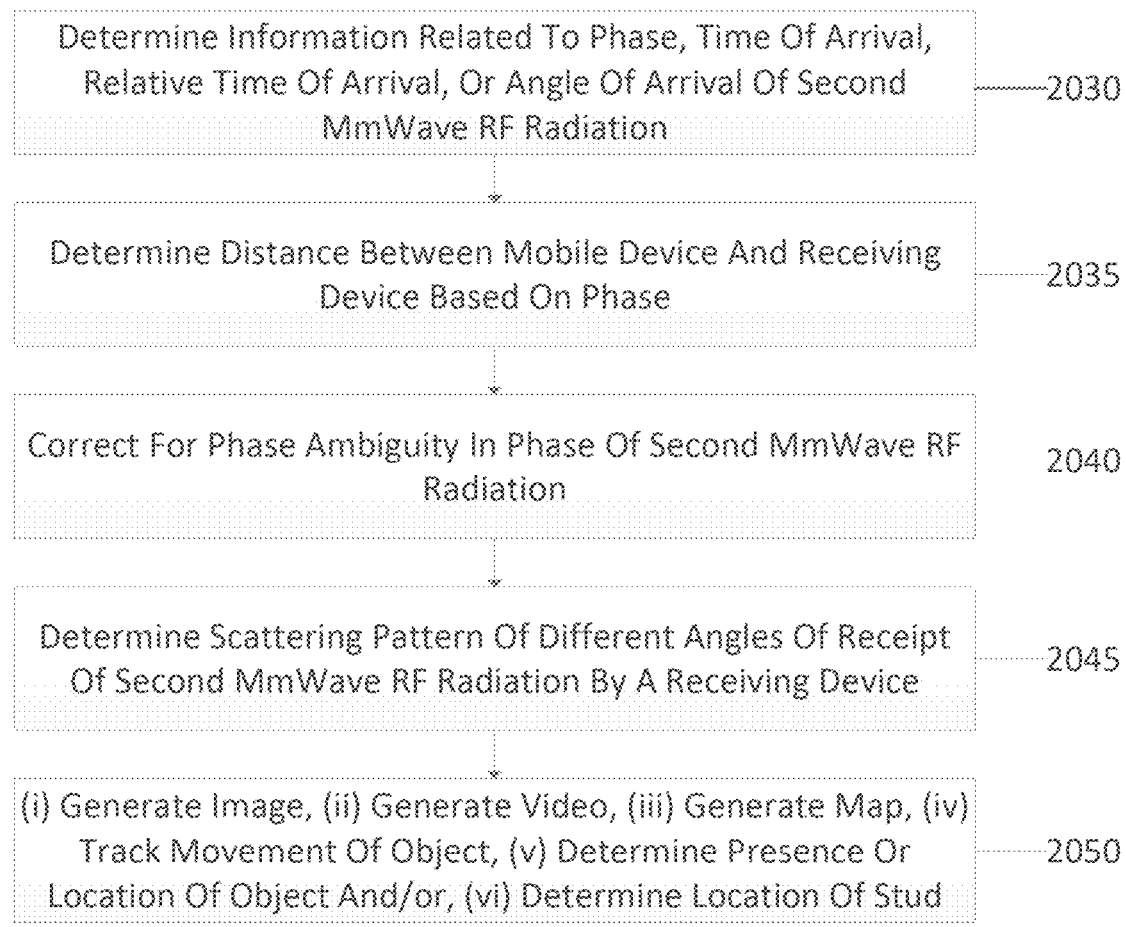

FIGS. 12A and 12B show an exemplary flow diagram of a method 2000 according to an exemplary embodiment of the present disclosure. For example, at procedure 2005, a direction of transmission of an adaptive antenna array can be modified based on an environment. At procedure 2010, a first millimeter wave (mmWave) radiofrequency (RF) radiation can be generated using a mobile device. At procedure 2015, the first mmWave RF radiation can be provided to the environment. At procedure 2020, the mobile device can receive the second mmWave RF radiation from the environment that can be based on the first mmWave RF radiation. At procedure 2025, information regarding the second mmWave RF radiation can be transmitted to a further device, which can be used to generate an image or video.

Additionally, at procedure 2030, information related to a phase, a time of arrival, a relative time of arrival, or an angle of arrival of the second mmWave RF radiation can be determined. At procedure 2035, a distance between the mobile device and a receiving device can be determined based on the phase. At procedure 2040, a phase ambiguity in the phase of the second mmWave RF radiation can be corrected for. At procedure 2045, a scattering pattern of different angles of receipt of the second mmWave RF radiation can be determined by a receiving device. At procedure 2050, an image can be generated, a video can be generated, a map can be generated, movement of an object can be tracked, a presence of location of an object can be determined, and/or a location of a stud of a wall can be determined.

Figure 15:
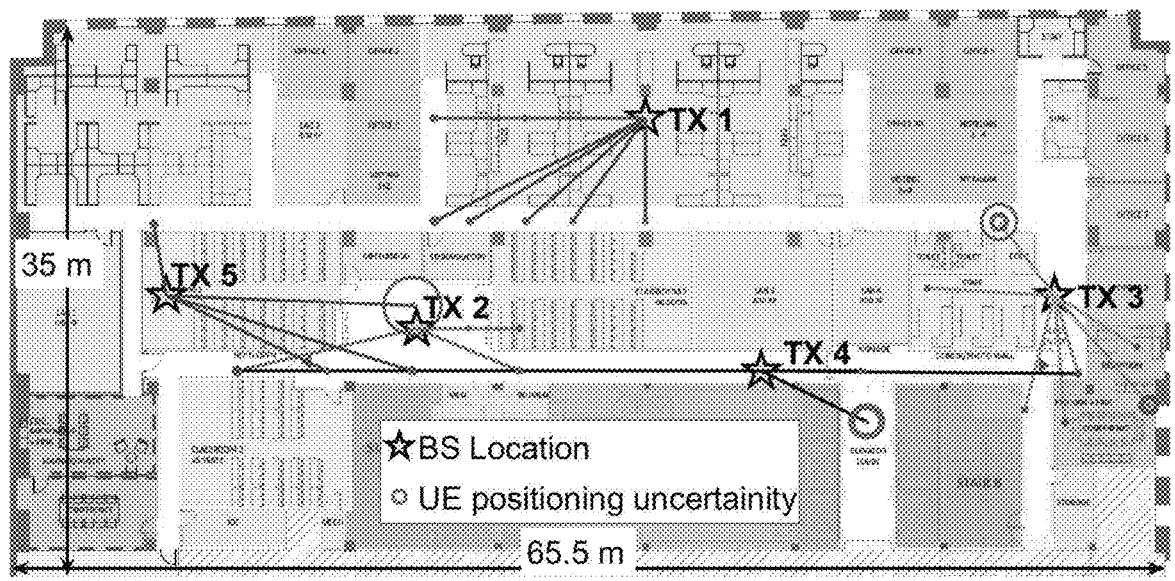
FIG. 15 is an exemplary illustration of an indication of an exemplary RMS positioning error of the method of present disclosure according to an exemplary embodiment.

The performance of MAP-AT was considered at the RX locations where mmWave measurements were conducted at 28, 73 and 140 GHz. FIG. 15 shows an exemplary illustration of an exemplary RMS positioning error of the method of present disclosure according to an exemplary embodiment. Three concentric error circles of radii equal to the RMS positioning error corresponding to the three levels of noise added to ToF measurements have been drawn centered at each user location. The error circles for two outlier user locations having errors of 4.0 m and 4.9 m have not been plotted. The localization error of the outliers can be reduced by using additional BSs for positioning the users.

Figure 16:
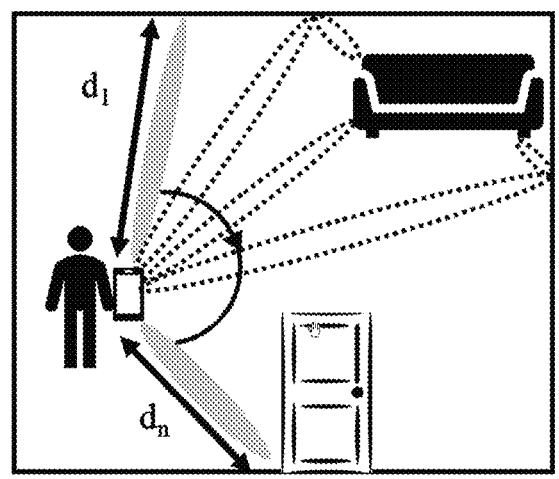
FIG. 16 is an exemplary map generated on the-the-fly using a mmWave radar on a cell phone.

Cell phones in the future shall likely have the capability to generate a map of the environment on the fly and "see in the dark" without a dedicated ranging RF front end. The UE could behave like a radar, measuring the distances of prominent features in the environment, such as walls, doors, and other obstructions. FIG. 16 is an exemplary map generated on the-the-fly using a mmWave radar on a cell phone.

Figure 17:
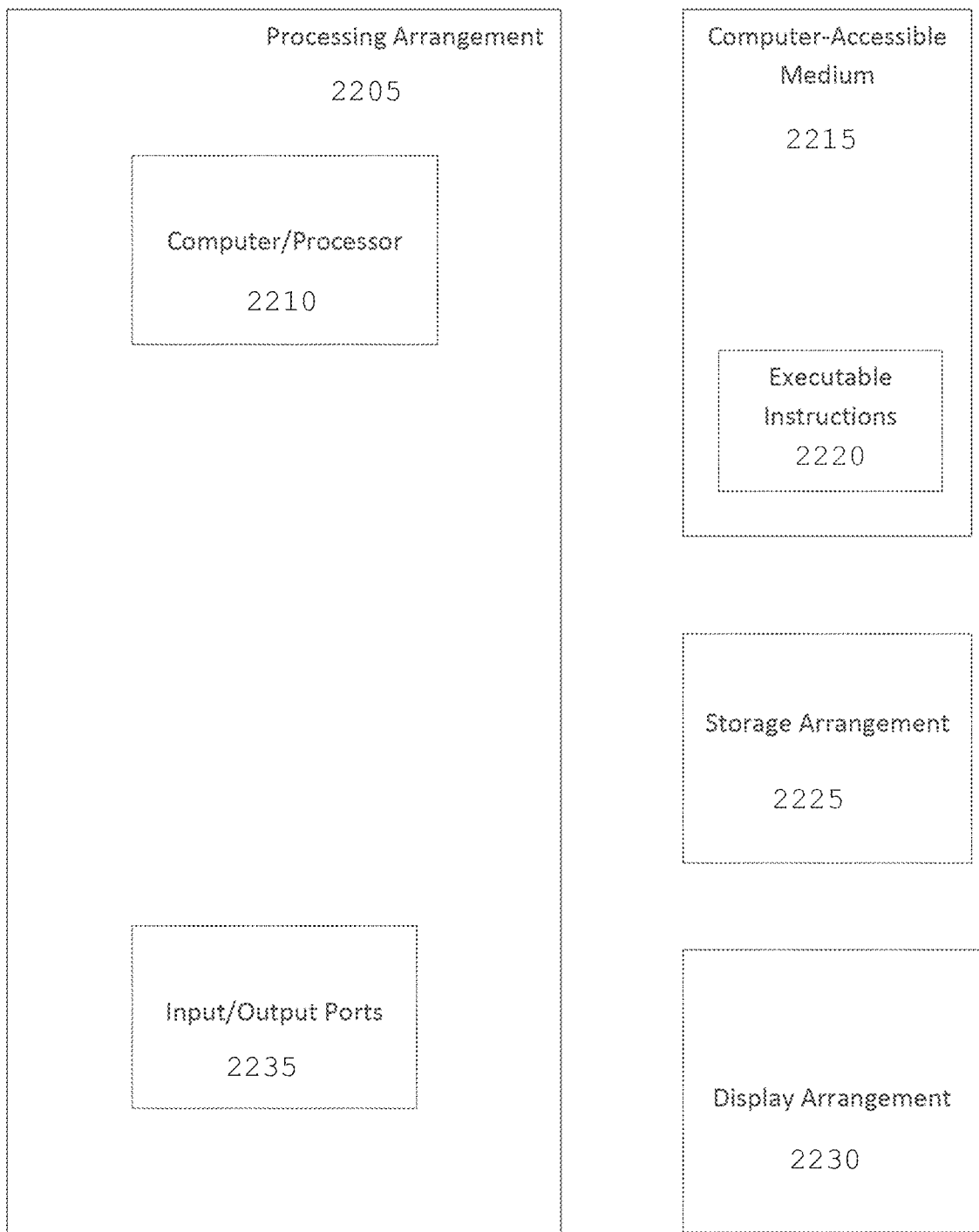
FIG. 17 is an illustration of an exemplary block diagram of an exemplary system in accordance with certain exemplary embodiments of the present disclosure.

FIG. 17 shows a block diagram of an exemplary embodiment of a system according to the present disclosure. For example, exemplary procedures in accordance with the present disclosure described herein can be performed by a processing arrangement and/or a computing arrangement 2305. Such processing/computing arrangement 2305 can be, for example entirely or a part of, or include, but not limited to, a computer/processor 2310 that can include, for example one or more microprocessors, and use instructions stored on a computer-accessible medium (e.g., RAM, ROM, hard drive, or other storage device).

As shown in FIG. 17, for example a computer-accessible medium 2315 (e.g., as described herein above, a storage device such as a hard disk, floppy disk, memory stick, CD-ROM, RAM, ROM, etc., or a collection thereof) can be provided (e.g., in communication with the processing arrangement 2305). The computer-accessible medium 2315 can contain executable instructions 2320 thereon. In addition or alternatively, a storage arrangement 2325 can be provided separately from the computer-accessible medium 2315, which can provide the instructions to the processing arrangement 2305 so as to configure the processing arrangement to execute certain exemplary procedures, processes, and methods, as described herein above, for example.

Further, the exemplary processing arrangement 2305 can be provided with or include an input/output ports 2335, which can include, for example a wired network, a wireless network, the internet, an intranet, a data collection probe, a sensor, etc. As shown in FIG. 17, the exemplary processing arrangement 2305 can be in communication with an exemplary display arrangement 2330, which, according to certain exemplary embodiments of the present disclosure, can be a touch-screen configured for inputting information to the processing arrangement in addition to outputting information from the processing arrangement, for example. Further, the exemplary display arrangement 2330 and/or a storage arrangement 2325 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties. Additionally, all systems, methods, computer-accessible mediums and apparatuses described herein can incorporate, use, operate, etc. any of the subject matter described in U.S. Provisional Patent Application No. 62/852,053, filed on May 23, 2019, which has been incorporated herein by reference in its entirety.

EXEMPLARY REFERENCES

The following references are hereby incorporated by reference, in their entireties:

[1] https://ecfsapi.fcc.gov/file/0228024926034/FCC-18-17A6.pdf.
[2] https://www.fcc.gov/ecfs/filing/0228024926034.
[3] https://ecfsapi.fcc.gov/file/0228024926034/FCC-18-17A1.pdf.
[4] Rappaport, et. al., "Millimeter Wave for 5G Cellular: It will work," IEEE Access 2013.
[5] S. Sun, et. al., "MIMO for millimeter-wave wireless communications: Beamforming, spatial multiplexing, or both?," IEEE Com. Mag., 2014.
[6] S. Sun, et. al, "Hybrid Beamforming for 5G Millimeter-Wave Multi-Cell Networks," IEEE InfoCom Honolulu, April 2018.
[7] C. M. P. Ho, et. al, "Antenna effects on indoor obstructed wireless channels and a deterministic image-based wideband propagation model for in-building personal communication systems," Intl. Journal of Wireless Information Networks, January 1994, pp 61-76, 1994.
[8] T. S. Rappaport and D. A. Hawbaker, Wide-band microwave propagation parameters using circular and linear polarized antennas for indoor wireless channels, IEEE Transactions on Communications, Vol. 40, No. 2, February 1992.
[9] T. S. Rappaport, "Wireless Communications, Principles and Practice" c. 2002 Pearson/Prentice Hall.
[10] Millimeter Wave Mobile Communications for 5G Cellular: It will work!" by Rappaport, et. al.
[11] O. Kanhere and T. S. Rappaport, "Position Locationing for Millimeter Wave Systems," in *Proc. IEEE 2018 Global Communications Conference*, December 2018, pp. 1-6.
[12] G. R. MacCartney, Jr. and T. S. Rappaport, "A flexible millimeter-wave channel sounder with absolute timing," *IEEE Journal on Selected Areas in Communications*, vol. 35, no. 6, pp. 1402-1418, June 2017.
[13] T. S. Rappaport et al., "Wireless Communications and Applications Above 100 GHz: Opportunities and Challenges for 6G and Beyond (Invited)," in *IEEE Access, vol. 7*, pp 78729-28757, May 2019.
[14] J. S. Parker, P. Mickelson, J. Yeak, K. Kremeyer, and J. Rife, "Exploiting the Terahertz Band for Radionavigation," *Journal of Infrared, Millimeter, and Terahertz Waves*, vol. 37, no. 10, pp. 1021-1042, October 2016.
[15] T. S. Rappaport, *Wireless Communications: Principles and Practice*, 2nd ed. Upper Saddle River, NJ: Prentice Hall, 2002.
[16] C. D. McGillem and T. S. Rappaport, "Infra-red location system for navigation of autonomous vehicles," in *Proceedings. 1988 IEEE International Conference on Robotics and Automation*, vol. 2, April 1988, pp. 1236-1238.
[17]—, "A beacon navigation method for autonomous vehicles," *IEEE Transactions on Vehicular Technology*, vol. 38, no. 3, pp. 132-139, August 1989.
[18] J. I. Bowditch, *American practical navigator*. Washington, D.C.: US Government Printing Office, 1938.
[19] T. Chi, M. Huang, S. Li, and H. Wang, "A packaged 90-to-300 GHz transmitter and 115-to-325 GHz coherent receiver in CMOS for full-band continuous-wave mm-wave hyperspectral imaging," in 2017 *IEEE International Solid-State Circuits Conference (ISSCC)*, February 2017, pp. 304-305.
[20] S. Kiran Doddalla and G. C. Trichopoulos, "Non-line of sight terahert imaging from a single viewpoint," in 2018 *IEEE/MTT-S International Microwave Symposium-IMS*, June 2018, pp. 1527-1529.
[21] G. R. MacCartney, Jr. et al., "Indoor office wideband millimeter-wave propagation measurements and models at 28 GHz and 73 GHz for ultra-dense 5G wireless networks (Invited Paper)," *IEEE Access*, vol. 3, pp. 2388-2424, October 2015.
[22] K. R. Schaubach, N. J. Davis, and T. S. Rappaport, "A ray tracing method for predicting path loss and delay spread in microcellular environments," in *Vehicular Technology Society 42nd VTS Conference—Frontiers of Technology*, vol. 2, May 1992, pp. 932-935.
[23] G. Durgin, N. Patwari, and T. S. Rappaport, "An advanced 3D ray launching method for wireless propagation prediction," in 1997 *IEEE 47th Vehicular Technology Conference. Technology in Motion*, vol. 2, May 1997, pp. 785-789.
[24] J. W. McKown and R. L. Hamilton, "Ray tracing as a design tool for radio networks," *IEEE Network*, vol. 5, no. 6, pp. 27-30, November 1991.
[25] C. M. Peter Ho, T. S. Rappaport, and M. P. Koushik, "Antenna effects on indoor obstructed wireless channels and a deterministic image-based wide-band propagation model for in-building personal communication systems," *International Journal of Wireless Information Networks*, vol. 1, no. 1, pp. 61-76, January 1994.
[26] S. Y. Tan and H. S. Tan, "A microcellular communications propagation model based on the uniform theory of diffraction and multiple image theory," *IEEE Transactions on Antennas and Propagation*, vol. 44, no. 10, pp. 1317-1326, October 1996.
[27] Y. Xing, O. Kanhere, S. Ju, and T. S. Rappaport, "Indoor Wireless Channel Properties at Millimeter Wave and Sub-Terahertz Frequencies: Reflection, Scattering, and Path Loss," in *IEEE 2019 Global Communications Conference*, pp. 1-6, December 2019.
[28] S. Ju et al., "Scattering Mechanisms and Modeling for Terahertz Wireless Communications," in 2019 *IEEE International Conference on Communications (ICC)*, May 2019, pp. 1-7.
[29] S. Sun, G. R. MacCartney, Jr., and T. S. Rappaport, "Millimeter-wave distance-dependent large-scale propagation measurements and path loss models for outdoor and indoor 5G systems," in *Proc. 10th EuCap, Davos, Switzerland*, April 2016, pp. 1-5.
[30] T. S. Rappaport et al., "Millimeter Wave Mobile Communications for 5G Cellular: It Will Work!" *IEEE Access*, vol. 1, pp. 335-349, May 2013.
[31] A. O. Kaya, L. Greenstein, D. Chizhik, R. Valenzuela, and N. Moayeri, "Emitter Localization and Visualization (ELVIS): A Backward Ray Tracing Algorithm for Locating Emitters," in 2007 *41st Annual Conference on Information Sciences and Systems*, March 2007, pp. 376-381.
[32] M. Aladsani, A. Alkhateeb, and G. C. Trichopoulos, "Leveraging mmWave Imaging and Communications for Simultaneous Localization and Mapping," in *International Conference on Acoustics, Speech, and Signal Processing (ICASSP)*, May 2019, pp. 1-4.
[33] P. Meissner, E. Leitinger, M. Frohle, and K. Witrisal, "Accurate and Robust Indoor Localization Systems Using Ultra-wideband Signals," in *European Navigation Conference (ENC)*, April 2013, pp. 1-9.
[34] B5GS19, "The Brooklyn 5G Summit," April 2019. [Online]. Available: https://brooklyn5gsummit.com/.
[35] FCC, "Spectrum horizons," *First Report and Order ET Docket* 18-21, Washington D. C., Mar. 21, 2019.
[36] T. Nagatsuma, "Breakthroughs in photonics 2013: Thz communications based on photonics," *IEEE Photonics Journal*, vol. 6, no. 2, pp. 1-5, April 2014.

[37] Ministry of Internal Affairs and Communications, "Frequency Assignment Plan (as of March 2019)," March 2019. [Online]. Available: https://www.tele.soumu.go.jp/e/adm/freq/search/share/plan.htm

[38] "Ieee standard for high data rate wireless multi-media networks—amendment 2: 100 gb/s wireless switched point-to-point physical layer," *IEEE Std* 802.15.3*d*-2017 (*Amendment to IEEE Std* 802.15.3-2016 *as amended by IEEE Std* 802.15.3*e*-2017), pp. 1-55, October 2017.

[39] V. Petrov, D. Moltchanov, and Y. Koucheryavy, "Applicability assessment of terahertz information showers for next-generation wireless networks," in 2016 *IEEE International Conference on Communications (ICC)*, May 2016, pp. 1-7.

[40] V. Petrov, A. Pyattaev, D. Moltchanov, and Y. Koucheryavy, "Terahertz band communications: Applications, research challenges, and standardization activities," in 2016 8*th International Congress on Ultra Modern Telecommunications and Control Systems and Workshops (ICUMT)*, October 2016, pp. 183-190.

[41] mmWave Coalition, "mmWave Coalition's NTIA comments," January 2019. [Online]. Available: http://mm-wavecoalition.org/mmwave-coalition-millimeter-waves/mmwave-coalitions-ntia-comments/

[42] K. Sengupta, T. Nagatsuma, and D. M. Mittleman, "Terahertz integrated electronic and hybrid electronic-photonic systems," *Nature Electronics*, vol. 1, no. 12, p. 622, 2018.

[43] Federal Communications Commission, "Use of Spectrum Bands Above 24 GHz For Mobile Radio Services: GN Docket No. 14-177," December 2018. [Online]. Available: https://docsfcc.gov/public/attachments/FCC-18-180A1.pdf

[44] G. R. MacCartney, Jr. et al., "Millimeter wave wireless communications: New results for rural connectivity," in *Proceedings of the 5th Workshop on All Things Cellular: Operations, Applications and Challenges: in conjunction with MobiCom 2016*, ser. ATC '16. New York, NY, USA: ACM, October 2016, pp. 31-36.

[45] G. R. MacCartney and T. S. Rappaport, "Rural macrocell path loss models for millimeter wave wireless communications," *IEEE Journal on Selected Areas in Communications*, vol. 35, no. 7, pp. 1663-1677, July 2017.

[146] T. S. Rappaport, J. N. Murdock, and F. Gutierrez, "State of the art in 60-GHz integrated circuits and systems for wireless communications," *Proceedings of the IEEE*, vol. 99, no. 8, pp. 1390-1436, August 2011.

[47] T. S. Rappaport et al., "Millimeter Wave Mobile Communications for 5G Cellular: It Will Work!" *IEEE Access*, vol. 1, pp. 335-349, May 2013.

[48] —, "Wireless Communications and Applications Above 100 GHz: Opportunities and Challenges for 6G and Beyond (Invited)," *IEEE Access*, February 2019.

[49] S. Priebe et al., "Channel and Propagation Measurements at 300 GHz," *IEEE Transactions on Antennas and Propagation*, vol. 59, no. 5, pp. 1688-1698, May 2011.

[50] T. Kleine-Ostmann et al., "Measurement of channel and propagation properties at 300 GHz," in 2012 *Conference on Precision electromagnetic Measurements*, July 2012, pp. 258-259.

[51] N. Khalid and O. B. Akan, "Wideband THz communication channel measurements for 5G indoor wireless networks," in 2016 *IEEE International Conference on Communications (ICC)*, May 2016, pp. 1-6.

[52] S. Sun, T. S. Rappaport, and M. Shafi, "Hybrid beamforming for 5 g millimeter-wave multi-cell networks," *IEEE Conference on Computer Communications Workshops (INFOCOM WKSHPS)*, April 2018.

[53] S. Ju. et al., "Scattering mechanisms and modeling for terahertz wireless communications," in *in proceeding of 2018 IEEE International Conference on Communications (ICC)*, 2018.

[54] J. Ma, R. Shrestha, L. Moeller, and D. M. Mittleman, "Channel performance for indoor and outdoor terahertz wireless links," *APL Photonics*, vol. 3, no. 5, pp. 1-13, February 2018.

[55] Y. Xing and T. S. Rappaport, "Propagation Measurement System and Approach at 140 GHzMoving to 6G and Above 100 GHz," in *IEEE* 2018 *Global Communications Conference*, December 2018, pp. 1-6.

[56] G. R. MacCartney and T. S. Rappaport, "A flexible millimeter-wave channel sounder with absolute timing," *IEEE Journal on Selected Areas in Communications*, vol. 35, no. 6, pp. 1402-1418, June 2017.

[57] Y. Xing et al., "Verification and calibration of antenna cross-polarization discrimination and penetration loss for millimeter wave communications," in 2018 *IEEE* 88*th Vehicular Technology Conference*, August 2018, pp. 1-6.

[58] H. T. Friis, "A note on a simple transmission formula," *Proceedings of the IRE*, vol. 34, no. 5, pp. 254-256, May 1946.

[59] R. Davies, M. Bensebti, M. A. Beach, and J. P. McGeehan, "Wireless propagation measurements in indoor multipath environments at 1.7 GHz and 60 GHz for small cell systems," in [1991 *Proceedings*] 41*st IEEE Vehicular Technology Conference*, May 1991, pp. 589-593.

[60] C. Thajudeen, A. Hoorfar, F. Ahmad, and T. Dogaru, "Measured complex permittivity of walls with different hydration levels and the effect on power estimation of twri target returns," *Progress in Electromagnetics Research*, vol. 30, pp. 177-199, 2011.

[61] T. S. Rappaport, *Wireless Communications: Principles and Practice*, 2nd ed. Upper Saddle River, NJ: Prentice Hall, 2002.

[62] V. Degli-Esposti, F. Fuschini, E. M. Vitucci, and G. Falciasecca, "Measurement and modelling of scattering from buildings," *IEEE Trans. on Ant. and Prop.*, vol. 55, no. 1, pp. 143-153, January 2007.

[63] C. R. Anderson and T. S. Rappaport, "In-building wideband partition loss measurements at 2.5 and 60 GHz," *IEEE Transactions on Wireless Communications*, vol. 3, no. 3, pp. 922-928, May 2004.

[64] G. D. Durgin, T. S. Rappaport, and H. Xu, "Partition-based path loss analysis for in-home and residential areas at 5.85 GHz," in 1998 *IEEE Global Communications Conference (GLOBECOM)*, vol. 2, November 1998, pp. 904-909.

[65] O. Kanhere and T. S. Rappaport, "Position locationing for millimeter wave systems," in *IEEE* 2018 *Global Communications Conference*, December 2018, pp. 1-6.

[663] O. Kanhere, S. Ju, Y. Xing, and T. S. Rappaport, "Map Assisted Millimeter Wave Localization," *in IEEE* 2019 *Global Communications Conference*, pp. 1-6, December 2019.

[67] G. D. Durgin, T. S. Rappaport, and H. Xu, "Measurements and models for radio path loss and penetration loss in and around homes and trees at 5.85 GHz," *IEEE Transactions on Communications*, vol. 46, no. 11, pp. 1484-1496, November 1998.

[68] J. Ryan, G. R. MacCartney, Jr., and T. S. Rappaport, "Indoor Office Wideband Penetration Loss Measurements

[69] B. Kapilevich et al., "Millimeter waves sensing behind walls-feseability study with fel radiation," 2007.

[70] Y. P. Zhang and Y. Hwang, "Measurements of the characteristics of indoor penetration loss," in 1994 IEEE 44th Vehicular Technology Conference (VTC), vol. 3, June 1994, pp. 1741-1744.

[71] L. M. Frazier, "Radar surveillance through solid materials," in Command, Control, Communications, and Intelligence Systems for Law Enforcement, vol. 2938. International Society for Optics and Photonics, 1997, pp. 139-147.

[72] A. K. M. Isa, A. Nix, and G. Hilton, "Impact of diffraction and attenuation for material characterization in millimeter wave bands," in 2015 Loughborough Antennas Propagation Conference (LAPC), November 2015, pp. 1-4.

[73] J. Kokkoniemi, J. Lehtomki, and M. Juntti, "Measurements on penetration loss in terahertz band," in 2016 10th European Conference on Antennas and Propagation (EuCAP), April 2016, pp. 1-5.

[74] G. R. MacCartney, Jr. et al., "Indoor office wideband millimeter-wave propagation measurements and models at 28 GHz and 73 GHz for ultra-dense 5G wireless networks (Invited Paper)," IEEE Access, vol. 3, pp. 2388-2424, October 2015.

[75] S. Deng, M. K. Samimi, and T. S. Rappaport, "28 GHz and 73 GHz millimeter-wave indoor propagation measurements and path loss models," in IEEE International Conference on Communications Workshops (ICCW), June 2015, pp. 1244-1250.

[76] S. Sun, G. R. MacCartney, Jr., and T. S. Rappaport, "Millimeter-wave distance-dependent large-scale propagation measurements and path loss models for outdoor and indoor 5G systems," in 2016 IEEE 10th European Conference on Antennas and Propagation (EuCAP), April 2016, pp. 1-5.

[77] S. Sun et al., "Synthesizing omnidirectional antenna patterns, received power and path loss from directional antennas for 5G millimeter-wave communications," in 2015 IEEE Global Communications Conference (GLOBECOM), December 2015, pp. 3948-3953.

[78] I. F. Akyildiz, J. M. Jornet, and C. Han, "Terahertz band: Next frontier for wireless communications," Physical Communication, vol. 12, pp. 16-32, September 2014.

[79] M. J. W. Rodwell, Y. Fang, J. Rode, J. Wu, B. Markman, S. T. uran Brunelli, J. Klamkin, and M. Urteaga, "100-340 GHz Systems: Transistors and Applications," in 2018 IEEE International Electron Devices Meeting (IEDM), December 2018, pp. 14.3.1-14.3.4.

[80] J. Harvey et al., "Exploiting High Millimeter Wave Bands for Military Communications, Applications, and Design," IEEE Access, vol. 7, pp. 52 350-52 359, April 2019.

[81] D. M. Mittleman, "Twenty years of terahertz imaging," Opt. Express, vol. 26, no. 8, pp. 9417-9431, April 2018.

[82] M. Aladsani, A. Alkhateeb, and G. C. Trichopoulos, "Leveraging mmWave Imaging and Communications for Simultaneous Localization and Mapping," in International Conference on Acoustics, Speech, and Signal Processing (ICASSP), May 2019, pp. 1-4.

[83] T. S. Rappaport, "6G and Beyond: Terahertz Communications and Sensing," 2019 Brooklyn 5G Summit Keynote, April 2019. [Online]. Available: https://ieeetv.ieee.org/conference-highlights/ted-tours-brooklyn-5 g-summit-2019?

[84] O. Kanhere and T. S. Rappaport, "Position locationing for millimeter wave systems," in IEEE 2018 Global Communications Conference, December 2018, pp. 1-6.

[85] H. Wang and T. S. Rappaport, "A parametric formulation of the UTD diffraction coefficient for real-time propagation prediction modeling," IEEE Antennas and Wireless Propagation Letters, vol. 4, pp. 253-257, August 2005.

[86] O. Kanhere, S. Ju, Y. Xing, and T. S. Rappaport, "Map Assisted Millimeter Wave Localization for Accurate Position Location," in IEEE Globecom, December 2019, pp. 1-6.

[87] M. J. W. Rodwell, "Sub-mm-wave technologies: Systems, ICs, THz transistors," in 2013 Asia-Pacific Microwave Conference Proceedings (APMC), November 2013, pp. 509-511.

[88] S. Kiran Doddalla and G. C. Trichopoulos, "Non-Line of Sight Terahertz imaging from a Single Viewpoint," in 2018 IEEE/MTT-S International Microwave Symposium-IMS, June 2018, pp. 1527-1529.

[89] S. Ju et al., "Scattering Mechanisms and Modeling for Terahertz Wireless Communications," in Proc. IEEE International Conference on Communications, May 2019, pp. 1-7.

[90] A. Velten, T. Willwacher, O. Gupta, A. Veeraraghavan, M. G. Bawendi, and R. Raskar, "Recovering three-dimensional shape around a corner using ultrafast time-of-flight imaging," Nature communications, vol. 3, p. 745, March 2012.

[91] M. O'Toole, D. B. Lindell, and G. Wetzstein, "Confocal non-line-of-sight imaging based on the light-cone transform," Nature, vol. 555, no. 7696, p. 338, March 2018.

[92] F. Xu, G. Shulkind, C. Thrampoulidis, J. H. Shapiro, A. Torralba, F. N. Wong, and G. W. Wornell, "Revealing hidden scenes by photon-efficient occlusion-based opportunistic active imaging," Optics express, vol. 26, no. 8, pp. 9945-9962, April 2018.

[93] A. Sume, M. Gustafsson, M. Herberthson, A. Janis, S. Nilsson, J. Rahm, and A. Orbom, "Radar detection of moving targets behind corners," IEEE Transactions on Geoscience and Remote Sensing, vol. 49, no. 6, pp. 2259-2267, June 2011.

[94] K. Thai, O. Rabaste, J. Bosse, D. Poullin, I. Hinostroza, T. Letertre, and T. Chonavel, "Around-the-corner radar: Detection and localization of a target in non-line of sight," in 2017 IEEE Radar Conference (RadarConf), May 2017, pp. 0842-0847.

[95] P. Setlur, T. Negishi, N. Devroye, and D. Erricolo, "Multipath exploitation in non-los urban synthetic aperture radar," IEEE Journal of Selected Topics in Signal Processing, vol. 8, no. 1, pp. 137-152, February 2014.

[96] R. Zetik, M. Eschrich, S. Jovanoska, and R. S. Thoma, "Looking behind a corner using multipath-exploiting uwb radar," IEEE Transactions on Aerospace and Electronic Systems, vol. 51, no. 3, pp. 1916-1926, July 2015.

[97] T. S. Rappaport et al., "Small-scale, local area, and transitional millimeter wave propagation for 5G communications," IEEE Transactions on Antennas and Propagation, vol. 65, no. 12, pp. 6474-6490, December 2017.

[98] G. C. Trichopoulos, H. L. Mosbacker, D. Burdette, and K. Sertel, "A Broadband Focal Plane Array Camera for Real-time THz Imaging Applications," IEEE Transactions on Antennas and Propagation, vol. 61, no. 4, pp. 1733-1740, April 2013.

[99] T. Chi, M. Huang, S. Li, and H. Wang, "A packaged 90-to-300 GHz transmitter and 115-to-325 GHz coherent receiver in CMOS for full-band continuous-wave mmwave hyperspectral imaging," in 2017 *IEEE International Solid-State Circuits Conference (ISSCC)*, February 2017, pp. 304-305.
[100] J. Zhou et al., "Integrated Full Duplex Radios," IEEE Communications Magazine, vol. 55, no. 4, April 2017, pp. 142-51.
[101] C. A. Balanis, Antenna Theory: Analysis and Design, 4th ed., Wiley, 2016
[102] T. S. Rappaport, J. H. Reed, and B. D. Woerner, "Position location using wireless communications on highways of the future," IEEE Communications Magazine, vol. 34, no. 10, pp. 33-41, October 1996.
[103] J. H. Reed, K. J. Krizman, B. D. Woerner, and T. S. Rappaport, "An overview of the challenges and progress in meeting the E-911 requirement for location service," IEEE Commun. Mag., vol. 36, no. 4, pp. 30-37, 1998.
[103] FCC, "Wireless E911 Location Accuracy Requirements," Fifth Report and Order PS Docket 07-114, April 2019.
[104] F. Van Diggelen and P. Enge, "The worlds first GPS MOOC and worldwide laboratory using smartphones," in Proc. 28th Int. Tech. meeting Satellite Divis. Inst. Navigat. (ION GNSS+ 2015), September 2015, pp. 361-369.
[105] 3GPP, "UMTS; Stage 2 functional specification of User Equipment (UE) positioning in UTRAN (Release 15)," TS 25.305 V15.0.0, July 2018.
[106] 3GPP, "E-UTRAN; Stage 2 functional specification of User Equipment (UE) positioning in E-UTRAN (Release 15)," TS 36.305 V15.0.0, July 2019.
[107] 3GPP, "E-UTRA; Requirements for support of radio resource management (Release 15)," TS 36.133 V15.9.0, January 2020.

What is claimed is:

1. A computer-based method for generating an estimated location of a portable device (PD) in an environment that includes a base station (BS), the PD including a PD antenna array connected to a PD radio frequency (RF) transmitter and a PD RF receiver, and the BS including a BS antenna array connected to a BS RF transmitter and a BS RF receiver, the method comprising computer steps of:
building a three-dimensional (3D) map of physical surroundings of the portable device, by steps including:
transmitting, by the PD RF transmitter via the PD antenna array, a plurality of RF radar beams, and receiving, via the PD RF receiver from the antenna array, reflections of the transmitted RF radar beams from RF radar reflective surfaces within an RF radar range of the PD, wherein
the transmitting the plurality of RF radar beams has an RF radar transmission configuration resulting in reflections of the transmitted RF radar beams including reflections from an RF reflective surface that, from the PD location, is a hidden reflective surface not visible to a user of the PD,
the RF radar transmission configuration includes the transmitted RF radar beams comprising radio frequencies within a band extending from 6 GHz to 1 THz,
generating, by an RF radar 3D imaging processing of the received RF radar reflections, at least a portion of the 3D map of physical surroundings of the PD, the portion including a 3D map feature corresponding to the hidden reflective surface,
generating the 3D map of physical surroundings of the PD, based at least in part on a repeating of the transmitting the plurality of RF radar beams, the receiving reflections of the transmitted RF radar beams, and the generating the at least a portion of the 3D map storing, and
storing the 3D map of physical surroundings of the PD in a computer-accessible storage medium or storage device; and
performing a PD transmit mode generating of the estimated location of the PD, wherein the PD transmit mode generating comprises computer steps of:
facilitating a receiving by the BS of at least two multipath components of an RF signal transmitted by the PD transmitter,
determining, based at least in part on the receiving by the BS, respective time of flight (ToF) information and angle of arrival (AoA) information of the at least two multipath components,
determining, by a map-assisted positioning with angle and time (MAP-AT) computer processing, one or more candidate locations of the PD, based at least in part on the ToF information, the AoA information, and the generated 3D map of physical surroundings, and
selecting the estimated location of the portable device, based on the one or more candidate locations.

2. The method of claim 1, further comprising:
prior to performing the PD transmit mode generating the estimated location of the PD, updating the 3D map of the physical surroundings using any among or any combination of two or more among a:
one or more video recordings of at least a portion of the physical surroundings, obtained using a visible-light camera,
one or more pictures of the environment obtained using the visible-light camera,
one or more light detection and ranging (LIDAR) techniques,
a computer-aided design (CAD) software application,
a hand drawing, and/or
floorplans or blueprints of a building.

3. The method of claim 1, wherein the determining the one or more candidate locations further comprises a comparing at least one candidate location with the ToF information and the AoA information.

4. The method of claim 1, further comprising facilitating a cooperative localization as a function of the determination of at least one candidate location.

5. The method of claim 1, wherein the determining the one or more candidate locations is performed by a computer arrangement that comprises (i) a mobile computer system provided at the PD, (ii) a fixed computer system provided at the base station, or (iii) a cloud computing system, or any combination of any two or more among (i), (ii), and (iii).

6. The method of claim 1, further comprising estimating a velocity or an acceleration of the portable device, by steps comprising applying a Kalman filter, and/or an extended Kalman filter, and/or a particle filter.

7. The method of claim 1, wherein the selecting the estimated position of the portable device comprises:
grouping the one or more candidate locations, into two or candidate location clusters, wherein the grouping is arranged such that, for each candidate location cluster, all candidate locations within the cluster are spaced not more than a maximum distance from one another;
selecting among the candidate location clusters the candidate location cluster containing the relative maximum number of the candidate locations;

computing a centroid of the candidate locations within the candidate location cluster containing the relative maximum number of candidate locations; and
setting the estimated position of the PD based on a result of the computing the centroid.

8. The method of claim 1, further comprising determining a carrier phase of at least one of the at least two multipath components received by the BS RF receiver, wherein the determining the one or more candidate locations is further based on the determined carrier phase.

9. The method of claim 1, further comprising, using one or more sensors onboard the PD:
determining an orientation of the PD, and/or
determining z-co-ordinates of the PD.

10. The method of claim 9, wherein the one or more sensors onboard the PD used for determining the orientation of the PD comprise a gyroscope and/or an accelerometer.

11. The method of claim 9, wherein determining z-coordinates of the PD is based at least in part on measurements from an onboard barometer.

12. The method of claim 1, wherein the selecting the at least one location is based on a lookup table which includes the AoA information and the ToF information measured at a location calibrated in a surveyed environment.

13. The method of claim 1, wherein at least one of the RF radar beams comprises (i) a pulsed signal, or (ii) a signal that discretized over a plurality of individual frequencies or (ii) and (ii).

14. The method of claim 1, wherein the PD antenna array is an adaptive antenna array and the transmitting the plurality of RF radar beams includes a sequential scanning, via the adaptive antenna array, in azimuth and elevation.

15. The method of claim 1, wherein the RF radar 3D imaging processing includes a holographic 3D imaging processing of the received RF radar reflections.

16. A non-transitory computer-accessible medium having stored thereon computer-executable instructions for selecting at least one location of a portable device (PD) in an environment that includes a base station (BS), the PD including a PD antenna array that is connected to a PD radio frequency (RF) transmitter and to a PD RF receiver, and the BS including BS antenna array that is connected to a BS RF transmitter and to a BS RF receiver, wherein, when a computer arrangement executes the instructions, the computer arrangement is configured to perform procedures comprising:
building a three-dimensional (3D) map of physical surroundings of the portable device, the building of the 3D map including:
causing a transmitting by the PD RF transmitter via the PD antenna array, of a plurality of RF radar beams, and receiving, via the PD RF receiver from the antenna array, reflections of the transmitted RF radar beams from RF radar reflective surfaces within an RF radar range of the PD,
wherein the transmitting the plurality of RF radar beams has an RF radar transmission configuration resulting in reflections of the transmitted RF radar beams including reflections from an RF reflective surface that, from the PD location, is a hidden reflective surface not visible to a user of the PD, and
the RF radar transmission configuration includes the transmitted RF radar beams comprising radio frequencies within a band extending from 6 GHz to 1 THz,
generating, by an RF radar 3D imaging processing of the received RF radar reflections, at least a portion of the 3D map of physical surroundings of the PD, the portion including a 3D map feature corresponding to the hidden reflective surface,
generating the 3D map of physical surroundings of the PD, based at least in part on a repeating of the transmitting the plurality of RF radar beams, the receiving reflections of the transmitted RF radar beams, and the generating the at least a portion of the 3D map storing, and
storing the generated 3D map of physical surroundings of the PD in a computer-accessible storage medium or storage device; and
performing a PD transmit mode generating of the estimated location of the PD, wherein the PD transmit mode generating comprises:
facilitating a receiving by the BS of at least two multipath components, of an RF signal transmitted from the PD transmitter,
determining, based at least in part on the BS receiving of the at least two multipath components, respective, time of flight (ToF) information and angle of arrival (AoA) information for each of the at least two multipath components,
determining, by steps that include map-assisted positioning with angle and time (MAP-AT) process, one or more candidate locations of the PD, based at least in part on the ToF information, the AoA information, and the generated map of physical surroundings, and
selecting the estimated location of the portable device, based on the one or more candidate locations.

17. A system for selecting a at least one location of a portable device (PD) in an environment that includes a base station (BS), wherein the PD includes a PD antenna array connected to a PD radio frequency (RF) transmitter and a PD RF receiver, and the BS includes a BS antenna array connected to a BS RF transmitter and a BS RF receiver, the BS RF receiver is configured to receive via the BS antenna array, from the PD RF transmitter, one or more RF signals, each of the one or more RF signals having at least two a multipath components, the system comprising:
at least one processor that is configured to build a three-dimensional (3D) map of physical surroundings of the portable device, by steps that include
causing a transmitting by the PD RF transmitter via the PD antenna array, of a plurality of RF radar beams, and receiving, via the PD RF receiver from the antenna array, reflections of the transmitted RF radar beams from RF radar reflective surfaces within an RF radar range of the PD,
wherein the transmitting the plurality of RF radar beams has an RF radar transmission configuration resulting in reflections of the transmitted RF radar beams including reflections from an RF reflective surface that, from the PD location, is a hidden reflective surface not visible to a user of the PD, and
the RF radar transmission configuration includes the transmitted RF radar beams comprising radio frequencies within a band extending from 6 GHz to 1 THz,
generate, by an RF radar 3D imaging processing of the received RF radar reflections, at least a portion of the 3D map of physical surroundings of the PD, the portion including a 3D map feature corresponding to the hidden reflective surface,
generate the 3D map of physical surroundings of the PD, based at least in part on a repeating of the transmitting the plurality of RF radar beams, the receiving reflections of the transmitted RF radar beams, and the generating the at least a portion of the 3D map storing, and store the generated 3D map of physical surroundings of the PD in a computer accessible storage medium or storage device;

at least one processor that is configured to perform a PD transmit mode generating of the estimated location of the PD, wherein the PD transmit mode generating includes to facilitate a receiving by the BS RF receiver via the BS antenna array of at least two multipath components of an RF signal transmitted by the PD RF transmitter, determine, based at least in part on the receiving by the BS, time of flight (ToF) information and angle of arrival (AoA) information of the at least two multipath components, determine, by a computer-executed map-assisted positioning with angle and time (MAP-AT) process, one or more candidate locations of the PD, based at least in part on the ToF information, the AoA information, and the generates 3D map of physical surroundings, and select the estimated location of the portable device based on the one or more candidate locations.

\* \* \* \* \*